United States Patent
Danilov et al.

(10) Patent No.: US 11,693,983 B2
(45) Date of Patent: Jul. 4, 2023

(54) DATA PROTECTION VIA COMMUTATIVE ERASURE CODING IN A GEOGRAPHICALLY DIVERSE DATA STORAGE SYSTEM

(71) Applicant: EMC IP Holding Company LLC, Hopkinton, MA (US)

(72) Inventors: Mikhail Danilov, Saint Petersburg (RU); Igor Medvedev, Seattle, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 373 days.

(21) Appl. No.: 17/083,135

(22) Filed: Oct. 28, 2020

(65) Prior Publication Data
US 2022/0129588 A1 Apr. 28, 2022

(51) Int. Cl.
*G06F 21/62* (2013.01)
*G06F 11/10* (2006.01)

(52) U.S. Cl.
CPC ...... *G06F 21/6218* (2013.01); *G06F 11/1044* (2013.01); *G06F 11/1076* (2013.01); *G06F 11/1096* (2013.01)

(58) Field of Classification Search
CPC ............ G06F 11/1096; G06F 11/1076; G06F 11/1044; G06F 21/6218; G06F 21/64; G06F 7/724
See application file for complete search history.

(56) References Cited

U.S. PATENT DOCUMENTS

| | | | |
|---|---|---|---|
| 4,675,869 A | * | 6/1987 | Driessen ............ H03M 13/151 |
| 5,675,802 A | | 10/1997 | Allen et al. |
| 5,805,788 A | | 9/1998 | Johnson |
| 5,950,225 A | | 9/1999 | Kleiman |
| 6,065,020 A | | 5/2000 | Dussud |
| 6,073,218 A | | 6/2000 | DeKoning et al. |

(Continued)

OTHER PUBLICATIONS

Notice of Allowance received for U.S. Appl. No. 16/584,800 dated Jun. 27, 2022, 33 pages.

(Continued)

*Primary Examiner* — Guy J Lamarre
(74) *Attorney, Agent, or Firm* — Amin, Turocy & Watson, LLP

(57) ABSTRACT

Commutative coding in a geographically diverse data storage system is disclosed. Commutative coding can achieve a same result as more conventional hierarchical erasure coding of data, but can be more efficient. Commutative coding can employ Galois Field (GF) based bit-matrix operations. The bit-matrix operations can employ a reduced GF order in associated with expanding elements of input matrixes. A reduced GF order can perform matrix operations at a lower complexity, e.g., employing AND operations for a GF(2) in contrast to XOR operations for a GF($2^w$), where w=4, 8, 16, etc. In an aspect, commutative coding can comprise generating a second-tier coding fragment based on applying a second erasure coding scheme, via bit-matrix operations, to a first-tier encoded fragment, wherein the first-tier encoded fragment is based on an input data fragment and a first erasure coding scheme.

20 Claims, 10 Drawing Sheets

(56) References Cited

U.S. PATENT DOCUMENTS

| | | | |
|---|---|---|---|
| 6,108,684 A | 8/2000 | DeKoning et al. |
| 6,233,696 B1 | 5/2001 | Kedem |
| 6,240,527 B1 | 5/2001 | Schneider et al. |
| 6,502,243 B1 | 12/2002 | Thomas |
| 6,549,921 B1 | 4/2003 | Ofek |
| 7,007,044 B1 | 2/2006 | Rafert et al. |
| 7,103,884 B2 | 9/2006 | Fellin et al. |
| 7,389,393 B1 | 6/2008 | Karr et al. |
| 7,577,091 B2 | 8/2009 | Antal et al. |
| 7,631,051 B1 | 12/2009 | Fein et al. |
| 7,636,814 B1 | 12/2009 | Karr et al. |
| 7,664,839 B1 | 2/2010 | Karr et al. |
| 7,680,875 B1 | 3/2010 | Shopiro et al. |
| 7,694,191 B1 | 4/2010 | Bono et al. |
| 7,721,044 B1 | 5/2010 | Chatterjee et al. |
| 7,653,792 B2 | 6/2010 | Shimada et al. |
| 7,752,403 B1 | 7/2010 | Weinman, Jr. |
| 7,895,394 B2 | 2/2011 | Nakajima et al. |
| 8,037,391 B1 * | 10/2011 | Jung ................... G06F 11/1076 |
| | | | 714/759 |
| 8,125,406 B1 | 2/2012 | Jensen et al. |
| 8,261,033 B1 | 9/2012 | Slik et al. |
| 8,370,542 B2 | 2/2013 | Lu et al. |
| 8,429,514 B1 | 4/2013 | Goel |
| 8,479,037 B1 | 7/2013 | Chatterjee et al. |
| 8,495,465 B1 | 7/2013 | Anholt et al. |
| 8,504,518 B1 | 8/2013 | Ghemawat et al. |
| 8,540,625 B2 | 9/2013 | Miyoshi |
| 8,683,205 B2 | 3/2014 | Resch et al. |
| 8,725,986 B1 | 5/2014 | Goel |
| 8,751,599 B2 | 6/2014 | Tran et al. |
| 8,751,740 B1 | 6/2014 | De Forest et al. |
| 8,751,897 B2 | 6/2014 | Borthakur et al. |
| 8,799,746 B2 | 8/2014 | Baker et al. |
| 8,832,234 B1 | 9/2014 | Brooker et al. |
| 8,856,619 B1 | 10/2014 | Cypher |
| 8,856,624 B1 | 10/2014 | Paniconi |
| 8,892,938 B1 | 11/2014 | Sundaram et al. |
| 8,972,478 B1 | 3/2015 | Storer et al. |
| 9,003,086 B1 | 4/2015 | Schuller et al. |
| 9,021,296 B1 | 4/2015 | Kiselev et al. |
| 9,037,825 B1 | 5/2015 | Donlan et al. |
| 9,052,942 B1 | 6/2015 | Barber et al. |
| 9,063,838 B1 | 6/2015 | Boyle et al. |
| 9,098,447 B1 | 8/2015 | Donlan et al. |
| 9,128,910 B1 | 9/2015 | Dayal et al. |
| 9,208,009 B2 | 12/2015 | Resch et al. |
| 9,218,135 B2 | 12/2015 | Miller et al. |
| 9,244,761 B2 | 1/2016 | Yekhanin et al. |
| 9,268,783 B1 | 2/2016 | Shilane et al. |
| 9,274,903 B1 | 3/2016 | Garlapati et al. |
| 9,280,430 B2 | 3/2016 | Sarfare et al. |
| 9,405,483 B1 | 8/2016 | Wei et al. |
| 9,411,717 B2 | 8/2016 | Goss et al. |
| 9,442,802 B2 | 9/2016 | Hung |
| 9,477,682 B1 | 10/2016 | Bent et al. |
| 9,495,241 B2 | 11/2016 | Flynn et al. |
| 9,619,256 B1 | 4/2017 | Natanzon et al. |
| 9,641,615 B1 | 5/2017 | Robins et al. |
| 9,665,428 B2 | 5/2017 | Vairavanathan et al. |
| 9,747,057 B1 | 8/2017 | Ramani et al. |
| 9,817,713 B2 | 11/2017 | Gupta et al. |
| 9,864,527 B1 | 1/2018 | Srivastav et al. |
| 9,942,084 B1 | 4/2018 | Sorenson, III |
| 9,971,649 B2 | 5/2018 | Dhuse et al. |
| 10,001,947 B1 | 6/2018 | Chatterjee et al. |
| 10,007,561 B1 | 6/2018 | Pudipeddi et al. |
| 10,055,145 B1 | 8/2018 | Danilov et al. |
| 10,061,668 B1 | 8/2018 | Lazier et al. |
| 10,089,026 B1 | 10/2018 | Puhov et al. |
| 10,097,659 B1 | 10/2018 | Rao |
| 10,108,819 B1 | 10/2018 | Donlan et al. |
| 10,127,234 B1 | 11/2018 | Krishnan et al. |
| 10,216,770 B1 | 2/2019 | Kulesza et al. |
| 10,242,022 B1 | 3/2019 | Jain et al. |
| 10,282,262 B2 | 5/2019 | Panara et al. |
| 10,289,488 B1 | 5/2019 | Danilov et al. |
| 10,331,516 B2 | 6/2019 | Danilov et al. |
| 10,361,810 B2 | 7/2019 | Myung et al. |
| 10,387,546 B1 | 8/2019 | Duran et al. |
| 10,496,330 B1 | 12/2019 | Bernat et al. |
| 10,503,611 B1 | 12/2019 | Srivastav et al. |
| 10,567,009 B2 | 2/2020 | Yang et al. |
| 10,579,490 B2 | 3/2020 | Danilov et al. |
| 10,613,780 B1 | 4/2020 | Naeni et al. |
| 10,628,043 B1 | 4/2020 | Chatterjee et al. |
| 10,644,408 B2 | 5/2020 | Sakai et al. |
| 10,671,431 B1 | 6/2020 | Dolan et al. |
| 10,705,911 B2 | 7/2020 | Vishnumolakala et al. |
| 10,733,053 B1 | 8/2020 | Miller et al. |
| 10,740,183 B1 | 8/2020 | Blaum et al. |
| 10,754,845 B2 | 8/2020 | Danilov et al. |
| 10,761,931 B2 | 9/2020 | Goyal et al. |
| 10,797,863 B2 | 10/2020 | Chen et al. |
| 10,846,003 B2 | 11/2020 | Danilov et al. |
| 10,924,543 B1 | 2/2021 | Chen et al. |
| 10,951,236 B2 | 3/2021 | Chen et al. |
| 11,023,331 B2 | 6/2021 | Danilov et al. |
| 11,150,995 B1 | 10/2021 | Dhoolam et al. |
| 2002/0049883 A1 | 4/2002 | Schneider et al. |
| 2002/0166026 A1 | 11/2002 | Ulrich et al. |
| 2002/0191311 A1 | 12/2002 | Ulrich et al. |
| 2003/0016596 A1 | 1/2003 | Chiquoine et al. |
| 2005/0027938 A1 | 2/2005 | Burkey |
| 2005/0050131 A1 * | 3/2005 | Lawrow ................... G06F 7/724 |
| | | | 708/492 |
| 2005/0071546 A1 | 3/2005 | Delaney et al. |
| 2005/0080982 A1 | 4/2005 | Vasilevsky et al. |
| 2005/0088318 A1 | 4/2005 | Liu et al. |
| 2005/0108775 A1 | 5/2005 | Bachar et al. |
| 2005/0140529 A1 | 6/2005 | Choi et al. |
| 2005/0234941 A1 | 10/2005 | Watanabe |
| 2006/0047896 A1 | 3/2006 | Nguyen et al. |
| 2006/0075007 A1 | 4/2006 | Anderson et al. |
| 2006/0143508 A1 | 6/2006 | Mochizuki et al. |
| 2006/0212744 A1 | 9/2006 | Benner et al. |
| 2006/0265211 A1 | 11/2006 | Canniff et al. |
| 2007/0076321 A1 | 4/2007 | Takahashi et al. |
| 2007/0239759 A1 | 10/2007 | Shen et al. |
| 2007/0250674 A1 | 10/2007 | Findberg et al. |
| 2008/0222480 A1 | 9/2008 | Huang et al. |
| 2008/0222481 A1 | 9/2008 | Huang et al. |
| 2008/0244353 A1 | 10/2008 | Dholakia et al. |
| 2008/0320061 A1 | 12/2008 | Aszmann et al. |
| 2009/0070771 A1 | 3/2009 | Yuyitung et al. |
| 2009/0113034 A1 | 4/2009 | Krishnappa et al. |
| 2009/0132543 A1 | 5/2009 | Chatley et al. |
| 2009/0172464 A1 | 7/2009 | Byrne et al. |
| 2009/0183056 A1 | 7/2009 | Aston |
| 2009/0204959 A1 | 8/2009 | Anand et al. |
| 2009/0240880 A1 | 9/2009 | Kawaguchi |
| 2009/0259882 A1 | 10/2009 | Shellhamer |
| 2010/0031060 A1 | 2/2010 | Chew et al. |
| 2010/0094963 A1 | 4/2010 | Zuckerman et al. |
| 2010/0174968 A1 | 7/2010 | Charles et al. |
| 2010/0218037 A1 | 8/2010 | Swartz et al. |
| 2010/0293348 A1 | 11/2010 | Ye et al. |
| 2010/0332748 A1 | 12/2010 | Van der Goot et al. |
| 2011/0029836 A1 | 2/2011 | Dhuse et al. |
| 2011/0040937 A1 | 2/2011 | Augenstein et al. |
| 2011/0066882 A1 | 3/2011 | Walls et al. |
| 2011/0106972 A1 | 5/2011 | Grube et al. |
| 2011/0107165 A1 | 5/2011 | Resch et al. |
| 2011/0138148 A1 | 6/2011 | Friedman et al. |
| 2011/0161712 A1 | 6/2011 | Athalye et al. |
| 2011/0191536 A1 | 8/2011 | Mizuno et al. |
| 2011/0196833 A1 | 8/2011 | Drobychev et al. |
| 2011/0246503 A1 | 10/2011 | Bender et al. |
| 2011/0292054 A1 | 12/2011 | Boker et al. |
| 2012/0023291 A1 | 1/2012 | Zeng et al. |
| 2012/0096214 A1 | 4/2012 | Lu et al. |
| 2012/0191675 A1 | 7/2012 | Kim et al. |
| 2012/0191901 A1 | 7/2012 | Norair |
| 2012/0204077 A1 | 8/2012 | D'Abreu et al. |

(56) References Cited

U.S. PATENT DOCUMENTS

| | | |
|---|---|---|
| 2012/0233117 A1 | 9/2012 | Holt et al. |
| 2012/0311395 A1 | 12/2012 | Leggette et al. |
| 2012/0317234 A1 | 12/2012 | Bohrer et al. |
| 2012/0321052 A1 | 12/2012 | Morrill et al. |
| 2013/0013564 A1 | 1/2013 | Ben-Or et al. |
| 2013/0047187 A1 | 2/2013 | Frazier et al. |
| 2013/0054822 A1 | 2/2013 | Mordani et al. |
| 2013/0067159 A1 | 3/2013 | Mehra |
| 2013/0067187 A1 | 3/2013 | Moss et al. |
| 2013/0088501 A1 | 4/2013 | Fell |
| 2013/0097470 A1 | 4/2013 | Hwang et al. |
| 2013/0145208 A1 | 6/2013 | Yen et al. |
| 2013/0238932 A1 | 9/2013 | Resch |
| 2013/0246876 A1 | 9/2013 | Manssour et al. |
| 2013/0290482 A1 | 10/2013 | Leggette |
| 2013/0305365 A1 | 11/2013 | Rubin et al. |
| 2014/0006850 A1* | 1/2014 | Aliev ................. G06F 11/2053 714/6.24 |
| 2014/0040417 A1 | 2/2014 | Galdwin et al. |
| 2014/0064048 A1 | 3/2014 | Cohen et al. |
| 2014/0082414 A1 | 3/2014 | Olster |
| 2014/0115182 A1 | 4/2014 | Sabaa et al. |
| 2014/0122745 A1 | 5/2014 | Singh et al. |
| 2014/0149794 A1 | 5/2014 | Shetty et al. |
| 2014/0164430 A1 | 6/2014 | Hadjieleftheriou et al. |
| 2014/0164694 A1 | 6/2014 | Storer |
| 2014/0172930 A1 | 6/2014 | Molaro et al. |
| 2014/0250450 A1 | 9/2014 | Yu et al. |
| 2014/0280375 A1 | 9/2014 | Rawson et al. |
| 2014/0281804 A1 | 9/2014 | Resch |
| 2014/0297955 A1 | 10/2014 | Yamazaki et al. |
| 2014/0304460 A1 | 10/2014 | Carlson, Jr. et al. |
| 2014/0331100 A1 | 11/2014 | Dhuse et al. |
| 2014/0351633 A1 | 11/2014 | Grube et al. |
| 2014/0358972 A1 | 12/2014 | Guarrieri et al. |
| 2014/0359244 A1 | 12/2014 | Chambliss et al. |
| 2014/0380088 A1 | 12/2014 | Bennett et al. |
| 2014/0380093 A1 | 12/2014 | Molaro et al. |
| 2014/0380125 A1 | 12/2014 | Calder et al. |
| 2014/0380126 A1 | 12/2014 | Yekhanin et al. |
| 2015/0006846 A1 | 1/2015 | Youngworth |
| 2015/0074065 A1 | 3/2015 | Christ et al. |
| 2015/0112951 A1 | 4/2015 | Narayanamurthy et al. |
| 2015/0134626 A1 | 5/2015 | Theimer et al. |
| 2015/0142863 A1 | 5/2015 | Yuen et al. |
| 2015/0160872 A1 | 6/2015 | Chen |
| 2015/0178007 A1 | 6/2015 | Moisa et al. |
| 2015/0186043 A1 | 7/2015 | Kesselman et al. |
| 2015/0254150 A1 | 9/2015 | Gordon et al. |
| 2015/0269025 A1 | 9/2015 | Krishnamurthy et al. |
| 2015/0303949 A1 | 10/2015 | Jafarkhani et al. |
| 2015/0331766 A1 | 11/2015 | Sarfare et al. |
| 2015/0370656 A1 | 12/2015 | Tsafrir et al. |
| 2015/0378542 A1 | 12/2015 | Saito et al. |
| 2016/0011935 A1 | 1/2016 | Luby |
| 2016/0011936 A1 | 1/2016 | Luby |
| 2016/0055054 A1 | 2/2016 | Patterson, III et al. |
| 2016/0085645 A1 | 3/2016 | Buzzard et al. |
| 2016/0162378 A1 | 6/2016 | Garlapati et al. |
| 2016/0169692 A1 | 6/2016 | Gupta |
| 2016/0170668 A1 | 6/2016 | Mehra |
| 2016/0217104 A1 | 7/2016 | Kamble et al. |
| 2016/0232055 A1 | 8/2016 | Vairavanathan et al. |
| 2016/0239384 A1 | 8/2016 | Slik |
| 2016/0253400 A1 | 9/2016 | McAlister et al. |
| 2016/0277497 A1 | 9/2016 | Bannister et al. |
| 2016/0292429 A1 | 9/2016 | Bannister et al. |
| 2016/0294419 A1 | 10/2016 | Sandell et al. |
| 2016/0328295 A1 | 11/2016 | Baptist et al. |
| 2016/0357443 A1 | 12/2016 | Li et al. |
| 2016/0357649 A1 | 12/2016 | Karrotu et al. |
| 2016/0371145 A1 | 12/2016 | Akutsu et al. |
| 2016/0378624 A1 | 12/2016 | Jenkins, Jr. et al. |
| 2016/0380650 A1 | 12/2016 | Calder et al. |
| 2017/0003880 A1 | 1/2017 | Fisher et al. |
| 2017/0004044 A1 | 1/2017 | Tormasov et al. |
| 2017/0010944 A1 | 1/2017 | Saito et al. |
| 2017/0017671 A1 | 1/2017 | Baptist et al. |
| 2017/0031945 A1 | 2/2017 | Sarab et al. |
| 2017/0097875 A1 | 4/2017 | Jess et al. |
| 2017/0102993 A1 | 4/2017 | Hu et al. |
| 2017/0115903 A1 | 4/2017 | Franke et al. |
| 2017/0116088 A1 | 4/2017 | Anami et al. |
| 2017/0123914 A1 | 5/2017 | Li et al. |
| 2017/0153946 A1 | 6/2017 | Baptist et al. |
| 2017/0185331 A1 | 6/2017 | Gao et al. |
| 2017/0187398 A1 | 6/2017 | Trusov |
| 2017/0187766 A1 | 6/2017 | Zheng et al. |
| 2017/0206025 A1 | 7/2017 | Viswanathan |
| 2017/0206135 A1 | 7/2017 | Zeng |
| 2017/0212680 A1 | 7/2017 | Waghulde |
| 2017/0212845 A1 | 7/2017 | Conway |
| 2017/0220662 A1 | 8/2017 | Barton et al. |
| 2017/0235507 A1 | 8/2017 | Sinha et al. |
| 2017/0262187 A1 | 9/2017 | Manzanares et al. |
| 2017/0268900 A1 | 9/2017 | Nicolaas et al. |
| 2017/0272209 A1* | 9/2017 | Yanovsky ........... G06F 12/0253 |
| 2017/0285952 A1 | 10/2017 | Danilov et al. |
| 2017/0286009 A1 | 10/2017 | Danilov et al. |
| 2017/0286436 A1 | 10/2017 | Neporada et al. |
| 2017/0286516 A1 | 10/2017 | Horowitz et al. |
| 2017/0288701 A1 | 10/2017 | Slik et al. |
| 2017/0344285 A1 | 11/2017 | Choi et al. |
| 2018/0032279 A1 | 2/2018 | Davis et al. |
| 2018/0052744 A1 | 2/2018 | Chen et al. |
| 2018/0063213 A1 | 3/2018 | Bevilacqua-Linn et al. |
| 2018/0074753 A1 | 3/2018 | Ober |
| 2018/0074881 A1 | 3/2018 | Burden |
| 2018/0088857 A1 | 3/2018 | Gao et al. |
| 2018/0107415 A1 | 4/2018 | Motwani et al. |
| 2018/0121286 A1 | 5/2018 | Sipos |
| 2018/0129417 A1 | 5/2018 | Sivasubramanian et al. |
| 2018/0129600 A1 | 5/2018 | Ishiyama et al. |
| 2018/0181324 A1 | 6/2018 | Danilov et al. |
| 2018/0181475 A1 | 6/2018 | Danilov et al. |
| 2018/0181612 A1 | 6/2018 | Danilov et al. |
| 2018/0217888 A1 | 8/2018 | Colgrove et al. |
| 2018/0246668 A1 | 8/2018 | Sakashita et al. |
| 2018/0267856 A1 | 9/2018 | Hayasaka et al. |
| 2018/0267985 A1 | 9/2018 | Badey et al. |
| 2018/0293017 A1 | 10/2018 | Curley et al. |
| 2018/0306600 A1 | 10/2018 | Nicolaas et al. |
| 2018/0307560 A1 | 10/2018 | Vishnumolakala et al. |
| 2018/0341662 A1 | 11/2018 | He |
| 2018/0375936 A1 | 12/2018 | Chirammal et al. |
| 2019/0028179 A1 | 1/2019 | Kalhan |
| 2019/0034084 A1 | 1/2019 | Nagarajan et al. |
| 2019/0043201 A1 | 2/2019 | Strong et al. |
| 2019/0043351 A1 | 2/2019 | Yang et al. |
| 2019/0050301 A1 | 2/2019 | Juniwal et al. |
| 2019/0065092 A1 | 2/2019 | Shah et al. |
| 2019/0065310 A1 | 2/2019 | Rozas |
| 2019/0102103 A1 | 4/2019 | Ari et al. |
| 2019/0114223 A1 | 4/2019 | Pydipaty et al. |
| 2019/0129644 A1 | 5/2019 | Gao et al. |
| 2019/0188079 A1 | 6/2019 | Kohli |
| 2019/0205437 A1 | 7/2019 | Larson et al. |
| 2019/0215017 A1 | 7/2019 | Danilov et al. |
| 2019/0220207 A1 | 7/2019 | Lingarajappa |
| 2019/0266062 A1 | 8/2019 | Borlick et al. |
| 2019/0342418 A1 | 11/2019 | Eda et al. |
| 2019/0356416 A1 | 11/2019 | Yanovsky et al. |
| 2019/0384500 A1 | 12/2019 | Danilov et al. |
| 2019/0386683 A1 | 12/2019 | Danilov et al. |
| 2020/0004447 A1 | 1/2020 | Danilov et al. |
| 2020/0026810 A1 | 1/2020 | Subramaniam et al. |
| 2020/0034339 A1 | 1/2020 | Gershaneck et al. |
| 2020/0034471 A1 | 1/2020 | Danilov et al. |
| 2020/0042178 A1 | 2/2020 | Danilov et al. |
| 2020/0050510 A1 | 2/2020 | Chien et al. |
| 2020/0081778 A1* | 3/2020 | Varanasi ............ H03M 13/373 |
| 2020/0104377 A1 | 4/2020 | Earnesty, Jr. et al. |
| 2020/0117547 A1 | 4/2020 | Danilov et al. |
| 2020/0117556 A1 | 4/2020 | Zou et al. |

(56) References Cited

U.S. PATENT DOCUMENTS

| | | | |
|---|---|---|---|
| 2020/0145511 A1 | 5/2020 | Gray et al. | |
| 2020/0151353 A1 | 5/2020 | Struttmann | |
| 2020/0204198 A1 | 6/2020 | Danilov et al. | |
| 2020/0218450 A1* | 7/2020 | Danilov | G06F 11/2094 |
| 2020/0241759 A1 | 7/2020 | Danilov et al. | |
| 2020/0382141 A1* | 12/2020 | Wang | H03M 13/2906 |
| 2021/0019067 A1 | 1/2021 | Miller et al. | |
| 2021/0019093 A1 | 1/2021 | Karr et al. | |
| 2021/0019237 A1 | 1/2021 | Karr et al. | |
| 2021/0034268 A1 | 2/2021 | Hara et al. | |
| 2021/0096754 A1 | 4/2021 | Danilov et al. | |
| 2021/0132851 A1 | 5/2021 | Danilov et al. | |
| 2021/0133049 A1 | 5/2021 | Danilov et al. | |
| 2021/0218420 A1 | 7/2021 | Danilov et al. | |
| 2021/0255791 A1 | 8/2021 | Shimada et al. | |
| 2021/0273660 A1 | 9/2021 | Danilov et al. | |

OTHER PUBLICATIONS

Notice of Allowance received for U.S. Appl. No. 16/179,486 dated Jun. 8, 2022, 67 pages.
Final Office Action received for U.S. Appl. No. 16/986,222 dated Jun. 17, 2022, 76 pages.
Final Office Action received for U.S. Appl. No. 17/153,602 dated Jul. 14, 2022, 34 pages.
Final Office Action received for U.S. Appl. No. 16/538,984 dated Jun. 1, 2022, 114 pages.
Notice of Allowance received for U.S. Appl. No. 17/333,815 dated Jun. 27, 2022, 27 pages.
Wu et al., "Improving I/O Performance of Clustered Storage Systems by Adaptive Request Distribution," 2006 15th IEEE International Conference on High Performance Distributed Computing, 2006, pp. 207-217.
Final Office Action dated Aug. 31, 2022 for U.S. Appl. No. 16/403,417, 37 pages.
Non-Final Office Action received for U.S. Appl. No. 16/399,897 dated Feb. 19, 2021, 56 pages.
Non-Final Office Action received for U.S. Appl. No. 16/670,715 dated Mar. 31, 2021, 60 pages.
Final Office Action received for U.S. Appl. No. 16/177,278 dated Feb. 24, 2021, 109 pages.
EMC; "EMC ECS (Elastic Cloud Storage) Architectural Guide v2.x", URL : https://www.dell.com/community/s/vjauj58549/attachments/vjauj58549/solutions-ch/477/1/h14071-ecs-architectural-guide-wp.pdf,Jun. 2015, 21 pages.
Mohan et al., "Geo-aware erasure coding for high-performance erasure-coded storage clusters", Springer Link, URL: https://link.springer.com/article/10.1007/s 12243-017-0623-2, Jan. 18, 2018.
Final Office Action received for U.S. Appl. No. 16/179,486 dated Jan. 28, 2021, 55 pages.
Non-Final Office Action received for U.S. Appl. No. 16/670,746 dated Feb. 16, 2021, 55 pages.
Dell Technologies, "ECS Overview and Architecture", h14071.18, Feb. 2021, 21 Pages.
Non-Final Office Action received for U.S. Appl. No. 16/177,285 dated Apr. 9, 2021, 41 pages.
Non-Final Office Action received for U.S. Appl. No. 16/779,208 dated Apr. 20, 2021, 71 pages.
Notice of Allowance received for U.S. Appl. No. 16/570,657 dated Sep. 7, 2021, 65 pages.
Ma et al., "An Ensemble of Replication and Erasure Codes for Cloud File Systems", Proceedings—IEEE INFOCOM, Apr. 2013, pp. 1276-1284.
Final Office Action received for U.S. Appl. No. 16/698,096 dated Sep. 7, 2021, 24 pages.
Final Office Action received for U.S. Appl. No. 16/177,285 dated Sep. 14, 2021, 65 pages.
Final Office Action received for U.S. Appl. No. 16/670,715 dated Sep. 7, 2021, 35 pages.
Final Office Action received for U.S. Appl. No. 16/179,486 dated Oct. 20, 2021, 46 pages.
Notice of Allowance received for U.S. Appl. No. 16/745,855 dated Sep. 10, 2021, 37 pages.
Non-Final Office Action received for U.S. Appl. No. 16/526,182 dated Nov. 24, 2021, 83 pages.
Notice of Allowance received for U.S. Appl. No. 16/888,144 dated Nov. 22, 2021, 71 pages.
Non-Final Office Action received for U.S. Appl. No. 16/209,185 dated Jun. 18, 2020, 22 pages.
Martin Hosken, Developing a Hyper-Converged Storage Strategy for VMware vCloud Director with VMware vSAN, Jan. 2018 (Year: 2018).
Non-Final Office Action received for U.S. Appl. No. 16/261,549 dated Apr. 15, 2020, 22 pages.
Non-Final Office Action received for U.S. Appl. No. 16/374,726 dated Jun. 2, 2020, 47 pages.
Natarajan, RAID 0, RAID 1, RAID 5, RAID 10 Explained with Diagrams, Aug. 10, 2010, thegeekstuff.com (18 pages).
Non-Final Office Action received for U.S. Appl. No. 16/177,285 dated Jul. 22, 2020, 31 pages.
Non-Final Office Action received for U.S. Appl. No. 16/261,547 dated Sep. 3, 2020, 26 pages.
Non-Final Office Action received for U.S. Appl. No. 16/261,548 dated Aug. 21, 2020, 42 pages.
Notice of Allowance received for U.S. Appl. No. 16/261,549 dated Jul. 17, 2020, 40 pages.
Qiang et al., "Dynamics Process of Long-running Allocation/Collection in Linear Storage Space", International Conference on Networking, Architecture, and Storage (NAS 2007), Guilin, 2007, pp. 209-216.
Non-Final Office Action received for U.S. Appl. No. 16/374,725 dated Aug. 19, 2020, 50 pages.
Non-Final Office Action received for U.S. Appl. No. 16/511,161 dated Jul. 10, 2020, 24 pages.
Notice of Allowance received for U.S. Appl. No. 15/862,547 dated Mar. 29, 2019 27 pages.
Non-Final Office Action received for U.S. Appl. No. 15/792,714 dated Apr. 4, 2019, 20 pages.
Final Office Action received for U.S. Appl. No. 15/792,714 dated Sep. 12, 2019, 43 pages.
Wikipedia "Garbage Collection", URL: https://en.wikipedia.org/wiki/Garbage_collection_(computer science) #Availability (Year: 2017) retrieved using the WayBackMachine, Sep. 8, 2017, 8 pages.
Wikipedia "Erasure code", URL: https://web.archive.org/web/20170908171158/https://en.wikipedia.org/wiki/Erasure_code (Year: 2017), retrieved using the WayBackMachine, Sep. 8, 2017, 5 pages.
Wikipedia "Front and back ends" URL: https://en.wikipedia.org/wiki/Front_and_back_ends (Year:2019), Sep. 6, 2019, 4 pages.
Notice of Allowance received for U.S. Appl. No. 15/792,714 dated Nov. 8, 2019, 31 pages.
Non-Final Office Action received for U.S. Appl. No. 15/791,390 dated Sep. 20, 2019, 27 pages.
Final Office Action received for U.S. Appl. No. 15/791,390 dated Feb. 6, 2020, 29 pages.
Non-Final Office Action received for U.S. Appl. No. 15/791,390 dated Apr. 30, 2020, 48 pages.
Huang et al., "Scale-RS: An Efficient Scaling Scheme for RS-Coded Storage Clusters," in IEEE Transactions on Parallel and Distributed Systems, vol. 26, No. 6, pp. 1704-1717, Jun. 1, 2015.
Non-Final Office Action received for U.S. Appl. No. 16/457,615 dated Jul. 20, 2020, 34 pages.
Non-Final Office Action received for U.S. Appl. No. 15/651,504 dated Mar. 21, 2019, 10 pages.
Non-Final Office Action received for U.S. Appl. No. 15/662,273 dated Nov. 16, 2018, 19 pages.
Final Office Action received for U.S. Appl. No. 15/662,273 dated May 15, 2019, 33 pages.
Non-Final Office Action received for U.S. Appl. No. 15/965,479 dated Apr. 15, 2019, 21 pages.
Non-Final Office Action received for U.S. Appl. No. 15/794,950 dated Jul. 9, 2019, 29 pages.

(56) References Cited

OTHER PUBLICATIONS

Final Office Action received for U.S. Appl. No. 15/651,504 dated Sep. 18, 2019, 15 pages.
Non-Final Office Action received for U.S. Appl. No. 15/952,179 dated Sep. 10, 2019, 42 pages.
Wikipedia, "Standard Raid Levels—RAID 6", URL: https://en.wikipedia.org/wiki/Standard_RAID_levels#RAID_6, Oct. 18, 2019, 11 pages.
Non-Final Office Action received for U.S. Appl. No. 15/656,382 dated Nov. 1, 2019, 47 pages.
Final Office Action received for U.S. Appl. No. 15/952,179 dated Nov. 26, 2019, 53 pages.
Non Final Office Action received for U.S. Appl. No. 16/024,314 dated Nov. 25, 2019, 42 pages.
Non- Final Office Action received for U.S. Appl. No. 16/177,278 dated Dec. 2, 2019, 55 pages.
Non-Final Office Action received for U.S. Appl. No. 15/651,504 dated Dec. 31, 2019, 18 pages.
Non-Final Office Action received for U.S. Appl. No. 16/010,246 dated Dec. 5, 2019, 67 pages.
Stonebreaker et al. "Distributed RAID—A New Multiple Copy Algorithm.", IEEE ICDE, 1990, pp. 430-437.
Muralidhar et al. "f4: Facebook's Warm BLOB Storage System", USENIX. OSDI, Oct. 2014, pp. 383-398.
Final Office Action dated Feb. 12, 2020 for U.S. Appl. No. 16/024,314, 29 pages.
Non-Final Office Action received for U.S. Appl. No. 16/010,255 dated Jan. 9, 2020, 31 pages.
Office Action dated Feb. 5, 2020 for U.S. Appl. No. 16/261,551, 30 pages.
Non-Final Office Action received for U.S. Appl. No. 16/228,612 dated Feb. 27, 2020, 49 pages.
Final Office Action received for U.S. Appl. No. 16/010,246 dated Mar. 16, 2020, 33 pages.
Final Office Action received for U.S. Appl. No. 15/656,382 dated Apr. 6, 2020, 31 pages.
Non-Final Office Action received for U.S. Appl. No. 15/582,167 dated Sep. 7, 2018, 19 pages.
Non-Final Office Action received for U.S. Appl. No. 15/952,179 dated Apr. 20, 2020, 68 pages.
Notice of Allowance received for U.S. Appl. No. 16/240,193, dated May 4, 2020, 46 pages.
Final Office Action received for U.S. Appl. No. 16/177,278, dated May 11, 2020, 53 pages.
Non-Final Office Action received for U.S. Appl. No. 16/403,417 dated Dec. 6, 2022, 39 pages.
Notice of Allowance received for U.S. Appl. No. 16/986,222 dated Oct. 13, 2022, 37 pages.
Non-Final Office Action received for U.S. Appl. No. 17/153,602 dated Oct. 25, 2022, 40 pages.
Final Office Action received for U.S. Appl. No. 16/803,913 dated Oct. 26, 2022, 102 pages.
Files Controlling User Accounts and Groups. https://access.redhat.com/documentation/en-us/red_hat_enterprise_linux/4, 2012, pp. 1-2. (Year: 2012).
Office Action dated Apr. 13, 2021 for U.S. Appl. No. 16/781,316, 21 pages.
Non-Final Office Action received for U.S. Appl. No. 16/670,715 dated Jan. 5, 2022, 22 pages.
Non-Final Office Action received for U.S. Appl. No. 16/834,649 dated Jan. 28, 2022, 26 pages.
Office Action dated Feb. 8, 2022 for U.S. Appl. No. 16/986,222, 62 pages.
Office Action dated Nov. 24, 2021 for U.S. Appl. No. 16/538,984, 30 pages.
Non-Final Office Action received for U.S. Appl. No. 16/698,096 dated Jan. 5, 2022, 21 pages.
Non-Final Office Action received for U.S. Appl. No. 16/231,018 dated May 8, 2020, 78 pages.
Notice of Allowance dated May 11, 2020 for U.S. Appl. No. 16/240,193, 24 pages.
Non-Final Office Action received for U.S. Appl. No. 16/228,624 dated Jun. 24, 2020, 65 pages.
Non-Final Office Action received for U.S. Appl. No. 16/240,272 dated Jun. 29, 2020, 64 pages.
Non-Final Office Action received for U.S. Appl. No. 16/228,612 dated Jun. 29, 2020, 62 pages.
Final Office Action received for U.S. Appl. No. 16/010,255 dated Jul. 23, 2020, 36 pages.
Office Action received for U.S. Appl. No. 16/010,246 dated Jul. 27, 2020 36 pages.
Office Action received for U.S. Appl. No. 16/177,278, dated Aug. 21, 2020, 53 pages.
Office Action received for U.S. Appl. No. 16/179,486, dated Aug. 13, 2020, 64 pages.
Guo et al., "GeoScale: Providing Geo-Elasticity in Distributed Clouds" 2016 IEEE International Conference on Cloud Engineering, 4 pages.
Guo et al., "Providing Geo-Elasticity in Geographically Distributed Clouds". ACM Transactions on Internet Technology, vol. 18, No. 3, Article 38. Apr. 2018. 27 pages.
Office Action received for U.S. Appl. No. 16/254,073, dated Aug. 18, 2020, 62 pages.
Non-Final Office Action received for U.S. Appl. No. 16/526,142 dated Oct. 15, 2020, 21 pages.
Notice of Allowance received U.S. Appl. No. 16/228,612 date Oct. 20, 2020, 84 pages.
Zhou, et al. "Fast Erasure Coding for Data Storage: A Comprehensive Study of the Acceleration Techniques" Proceedings of the 17th Usenix Conference on File and Storage Technologies (FAST '19), [https://www.usenix.org/conference/fast19/presentation/zhou], Feb. 2019, Boston, MA, USA. 14 pages.
Non-Final Office Action received for U.S. Appl. No. 16/010,255 dated Oct. 29, 2020, 65 pages.
Final Office Action received for U.S. Appl. No. 16/240,272 dated Oct. 27, 2020, 42 pages.
Non-Final Office Action received for U.S. Appl. No. 16/399,902 dated Oct. 28, 2020, 83 pages.
Notice of Allowance received for U.S. Appl. No. 16/374,726 dated Nov. 20, 2020, 78 pages.
Final Office Action received for U.S. Appl. No. 16/228,624 dated Dec. 1, 2020, 63 pages.
Non-Final Office Action received for U.S. Appl. No. 16/570,657 dated Nov. 27, 2020, 75 pages.
Final Office Action received for U.S. Appl. No. 16/177,285 dated Dec. 30, 2020, 61 pages.
Final Office Action received for U.S. Appl. No. 16/511,161 dated Dec. 30, 2020, 61 pages.
Non-Final Office Action received for U.S. Appl. No. 16/399,895 dated Jan. 4, 2021, 64 pages.
Notice of Allowance received for U.S. Appl. No. 16/374,726 dated Jan. 6, 2021, 56 pages.
Non-Final Office Action received for U.S. Appl. No. 16/584,800 dated Mar. 3, 2022, 90 pages.
Non-Final Office Action received for U.S. Appl. No. 16/403,417 dated Feb. 25, 2022, 100 pages.
Non-Final Office Action received for U.S. Appl. No. 17/153,602 dated Mar. 16, 2022, 40 pages.
Notice of Allowance received for U.S. Appl. No. 17/333,793 dated Mar. 9, 2022, 39 pages.
Sun et al., "Data Management across Geographically-Distributed Autonomous Systems: Architecture, Implementation, and Performance Evaluation," IEEE Transactions on Industrial Informatics, 2019, 9 pages.
Notice of Allowance dated May 16, 2022 for U.S. Appl. No. 16/526,182, 54 pages.
Notice of Allowance received for U.S. Appl. No. 16/726,428 dated Jun. 14, 2021, 34 pages.
Non-Final Office Action received for U.S. Appl. No. 16/698,096 dated May 24, 2021, 62 pages.
Non-Final Office Action received for U.S. Appl. No. 16/745,855 dated May 13, 2021, 71 pages.

(56) References Cited

OTHER PUBLICATIONS

Non-Final Office Action received for U.S. Appl. No. 16/834,649 dated Jun. 24, 2021, 61 pages.
Non-Final Office Action received for U.S. Appl. No. 16/179,486 dated May 12, 2021, 50 pages.
Non-Final Office Action received for U.S. Appl. No. 16/570,657 dated May 12, 2021, 79 pages.
Non-Final Office Action received for U.S. Appl. No. 16/670,765 dated Jul. 20, 2021, 79 pages.
Thomasian et al., "Hierarchical RAID: Design, performance, reliability, and recovery", J. Parallel Distrib. Comput. vol. 72 (2012) pp. 1753-1769.
Office Action dated Sep. 3, 2021 for U.S. Appl. No. 16/803,913, 23 pages.
Office Action dated Jan. 25, 2022 for U.S. Appl. No. 16/803,913, 25 pages.
Office Action dated May 27, 2022 for U.S. Appl. No. 16/803,913, 24 pages.
RAID vs. non-RAID Storage—Difference & Comparison. https://www.fromdev.com/2014/01/raid-vs-non-raid-storage-difference.html, pp. 1-4, 2014. (Year: 2014).
Office Action dated Feb. 28, 2023 for U.S. Appl. No. 16/403,417, 36 pages.
Notice of Allowance dated Feb. 8, 2023 for U.S. Appl. No. 17/153,602, 27 pages.
Office Action dated Mar. 31, 2023 for U.S. Appl. No. 17/152,537, 95 pages.

\* cited by examiner

DATA PROTECTION VIA COMMUTATIVE ERASURE CODING IN A GEOGRAPHICALLY DIVERSE DATA STORAGE SYSTEM

TECHNICAL FIELD

The disclosed subject matter relates to data protection, more particularly, to protecting data represented in a data chunk stored via a geographically diverse data storage system, wherein said system can employ a plurality of geographically diverse storage zones to enable data redundancy that is geographically diverse and can facilitate access to data that is resilient to a first representation of the data becoming less accessible via said system.

BACKGROUND

Conventional data storage techniques can employ convolution and deconvolution of data to conserve storage space. As an example, convolution can allow data to be packed or hashed in a manner that uses less space that the original data. Moreover, convolved data, e.g., a convolution of first data and second data, etc., can typically be de-convolved to the original first data and second data. One use of data storage is in bulk data storage.

DETAILED DESCRIPTION

Figure 1:
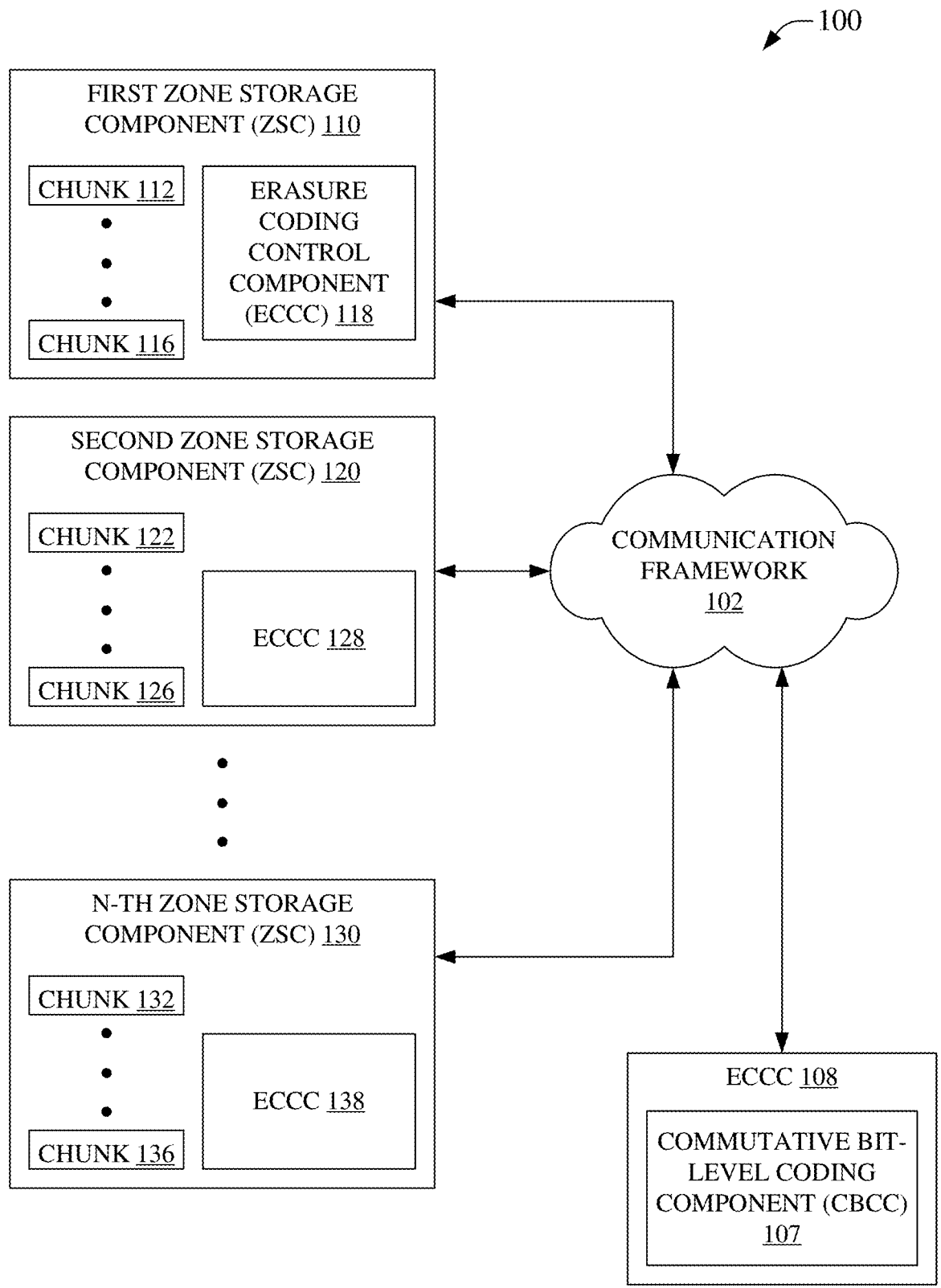
FIG. 1 is an illustration of an example system that can facilitate chunk recovery via commutative erasure coding in a geographically diverse data storage system, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As mentioned, data storage techniques can employ convolution and deconvolution to conserve storage space. As an example, convolution can allow data to be packed or hashed in a manner that uses less space that the original data. Moreover, convolved data, e.g., a convolution of first data and second data, etc., can typically be de-convolved to the original first data and second data. One use of data storage is in bulk data storage. Examples of bulk data storage can include networked storage, e.g., cloud storage, for example ECS offered by Dell EMC, formerly known as Elastic Cloud Storage by Dell EMC. Bulk storage can, in an aspect, manage disk capacity via partitioning of disk space into blocks of fixed size, frequently referred to as data chunks, chunks, etc., for example a 128 MB chunk, etc. Chunks can be used to store user data, and the chunks can be shared among the same or different users, for example, one chunk may contain fragments of several user objects. A chunk's content can generally be modified in an append-only mode to prevent overwriting of data already added to the chunk. As such, when a typical chunk is determined to be 'full enough,' it can be sealed so that the data therein is generally not available for further modification, e.g., the chunk can be designated as immutable. These chunks can then be manipulated for storage in a geographically diverse manner to allow for recovery of the data where a first copy of the data is destroyed, e.g., disaster recovery, etc. Chunks from a data storage device, e.g., 'zone storage component' (ZSC), 'zone storage device' (ZSD), etc., located in a first geographic location, hereinafter a 'zone', etc., can be stored in a second zone storage device that is located at a second geographic location different from the first geographic location. Generally, geographic diversity is of a scale so as to provide data protection against regional insults a geographically diverse data storage system. This can enable recovery of data where a first zone storage device is damaged, destroyed, offline, etc., e.g., disaster recovery of data, by accessing the off-site data from a second zone storage device in a different geographic area.

Geographically diverse data storage can use data compression to store data. As an example, a storage device in Topeka can store a backup of data from a first zone storage device in Houston, e.g., Topeka can be considered geographically diverse from Houston. As a second example, data chunks representing data from Seattle and San Jose can be stored in Denver. The example Denver storage can be compressed or uncompressed, wherein uncompressed can indicate that the Seattle and San Jose chunks are replicated in Denver, and wherein compressed can indicate that the Seattle and San Jose chunks are convolved in Denver, for example via an 'XOR' operation, into a different chunk, e.g., a convolved chunk, that can enable recovery of the Seattle or San Jose data from the convolved chunk, but where the convolved chunk can typically consume less storage space in Denver than the sum of the storage space for both the Seattle and San Jose replica chunks individually in Denver. In an aspect, compression can comprise convolving data and decompression can comprise deconvolving data, hereinafter the terms compress, compression, convolve, convolving, etc., can be employed interchangeably unless explicitly or implicitly contraindicated, and similarly, decompress, decompression, deconvolve, deconvolving, etc., can be used interchangeably unless explicitly or implicitly contraindicated. Compression, therefore, can allow original data to be recovered from a compressed chunk that consumes less storage space than storage of the uncompressed data chunks. This can be beneficial in that data from a location can be backed up by redundant data in another location via a compressed chunk, wherein a redundant data chunk can be smaller than the sum of the data chunks contributing to the compressed chunk. As such, local chunks, e.g., chunks from different zone storage devices, can be compressed via a convolution technique to reduce the amount of storage space used at a geographically distinct location.

In an aspect, the presently disclosed subject matter can include 'zones'. A zone can correspond to a geographic location or region. As such, different zones can be associated with different geographic locations or regions. As an example, Zone A can comprise Seattle, Wash., Zone B can comprise Dallas, Tex., and, Zone C can comprise Boston, Mass. In this example, where a local chunk from Zone A is replicated, e.g., compressed or uncompressed, in Zone C, an earthquake in Seattle can be less likely to damage the replicated data in Boston. Moreover, a local chunk from Dallas can be convolved with the local Seattle chunk, which can result in a compressed/convolved chunk, e.g., a partial or complete chunk, which can be stored in Boston. As such, either the local chunk from Seattle or Dallas can be used to de-convolve the partial/complete chunk stored in Boston to recover the full set of both the Seattle and Dallas local data chunks. The convolved Boston chunk can consume less disk space than the sum of the Seattle and Dallas local chunks. An example technique can be "exclusive or" convolution, hereinafter 'XOR', '$\oplus$', etc., where the data in the Seattle and Dallas local chunks can be convolved by XOR processes to form the Boston chunk, e.g., C=A1$\oplus$B1, where A1 is a replica of the Seattle local chunk, B1 is a replica of the Dallas local chunk, and C is the convolution of A1 and B1. Of further note, the disclosed subject matter can further be employed in more or fewer zones, in zones that are the same or different than other zones, in zones that are more or less geographically diverse, etc. As an example, the disclosed subject matter, in some embodiments, can be applied to data of a single disk, memory, drive, data storage device, etc., without departing from the scope of the disclosure, e.g., the zones in some embodiments can represent different logical areas of the single disk, memory, drive, data storage device, etc. Moreover, it will be noted that convolved chunks can be further convolved with other data, e.g., D=C1$\oplus$E1, etc., where E1 is a replica of, for example, a Miami local chunk, E, C1 is a replica of the Boston partial chunk, C, from the previous example and D is an XOR of C1 and E1 located, for example, in Fargo.

In an aspect, erasure coding can be employed to protect data in a geographically diverse data storage system. In an aspect, erasure coding can protect data in the disclosed chunks, e.g., can protect replica chunks, convolved chunks, other chunks that have already undergone previous erasure encoding, etc. As such, erasure coding can provide data protection in a geographically diverse data storage system, including systems that spread data geographically with or without convolution. Generally, erasure coding can divide a data portion (D) into k data fragments. During an encoding operation, m coding fragments can be created, wherein the coding fragments can provide data redundancy. As such, encoding can typically assure that a loss of any m fragments of the k+m fragments can be tolerated without loss of data access. If up to m fragments are lost or otherwise become less accessible, the less accessible fragments can be restored via a decoding operation. An erasure coding protection scheme can be identified as resulting in k+m fragments, e.g., k data fragments and m coding fragments result for a single data portion of a protection set, e.g., for a data chunk, etc. Accordingly, dividing data of a chunk into k data fragments, erasure encoding the k data fragments to generate m coding fragments, can result in a protection set for the chunk that comprises k+m fragments. Erasure coding can also be performed at more macro levels, for example, by treating 12 chunks as 12 data fragments, the 12 chunks can be erasure encoded to generate four coding fragments, such that the 12 chunks and the four coding fragments can constitute a protection set that can protect access to the data of the 12 chunks with the loss of up to any four of the group of 12 chunks and four coding fragments.

Use of different tiers of erasure coding can be employed in a geographically diverse data storage system. As an example, erasure coding of data in a chunk can enable protection of the chunk that is convenient to replicating data between zones, e.g., Chunk A→Chunk A', where A' is an encoding of A, can enable access to data represented in Chunk A even where up to m fragments of Chunk A' are less accessible. In this example, encoding a chunk can a facilitate replicating the chunk to a geographically diverse zone by hardening against possible replication errors, e.g., if Chunk A is replicated to another zone as Chunk rA, Chunk rA can have replication defects that can make properly accessing the data represented in Chunk A (as replicated in Chunk rA) less probable, however, where Chunk A is erasure coded, such that Chunk A→Chunk A', and then replicated to the other zone as Chunk rA', where rA' is a replicate of Chunk A' that is an encoding of Chunk A, then access to data represented in Chunk A (and replicated in Chunk rA') can be feasible even with damage of up to m fragments of Chunk rA'. As such, encoding of chunks, e.g., a first-tier of erasure coding, can be favored for replication of data among zones of a geographically diverse data storage system.

It can be appreciated that erasure coding of chunks simply to harden the chunks for safer replication, e.g., first-tier erasure coding, typically does not result in conserving storage space. In an aspect, hardening data via erasure coding generally does not reduce the size of the data, and can actually result in a protection set can be slightly larger due to the addition of m coding fragments to the k data fragments to form a protection set of k+m fragments, and therefore replicating hardened data can consume as much, or more, storage space than equivalent replication without hardening. It is noted that encoded data can be convolved to conserve storage space, that data can be convolved to conserve storage space prior to encoding, etc. Moreover, employing erasure coding can enable conservation of storage space for multiply redundant data. As an example, to protect four chunks, e.g., treating each chunk as a data fragment, in six zones of a geographically diverse storage system against the loss of any two zones, the four chunks can be double replicated and spread among the six zones, resulting in storing 12 chunks worth of data, e.g., the four actual data chunks, four first replicates, and four second replicates, for example, see FIG. 2. However, use of erasure coding can facilitate storage space conservation, for example employing a EC(4+2) scheme, the four chunks can be doubly replicated and spread, then the spread replicated chunks can be erasure coded in each zone, resulting in two coding chunks that can be further spread among the zones, allowing the replicates to be deleted, leaving the original four chunks and distributed two coding chunks, wherein access to the data of the four chunks can be accessible against the loss of any two zones, for example, see 211 of FIG. 2 providing redundancy via erasure coding of replicated chunks form other zones of system 200. In an aspect, erasure coding of data comprising a chunk can be regarded as a first-tier erasure coding and erasure coding of multiple chunks of data can be regarded as a second-tier erasure coding.

In an aspect, erasure coding can be employed at different levels of a geographically diverse storage system, e.g., hierarchical erasure coding, for example, at a chunk-level to erasure encode/decode data of a chunk, e.g., a first-tier erasure coding, at a zone-level to erasure encode/decode multiple chunks, e.g., a second-tier erasure coding, etc. In an aspect, a same or different erasure coding schemes can be used for different tiers, levels, different chunks, etc. As an example, a 4+2 scheme can be employed at the zone-level, while a both a 12+4 scheme and a 10+2 scheme can be used at the chunk-level in a single zone to encode/decode different chunks. Moreover, for example, chunks from zone-level erasure coding can then undergo chunk-level erasure coding, such that the resulting data segments of the chunks of a zone can be said to have been 'doubly erasure encoded.' Accordingly, a chunk of data can be hardened via a first-tier encoding, replicated, and provide protection via a distribution of coding chunks resulting from a second-tier encoding of the chunk with other chunks.

Conventionally, double encoding can be illustrated in the following example for a storage system comprising Zones A to F. In Zone A, chunk A1 can be first-tier encoded to harden it for replication, e.g., A1'=e(A1). Similarly, hardened chunks can be generated in other zones, for example, for example, B2', C4', E2', D3', and F1', for zones B to F. At this point, each zone can comprise original data and an encoded data, e.g., Zone A can comprise chunks A1 and A1'. The encoded data can be replicated to another zone, for example in a round robin scheme, etc., which can provide redundant copies, e.g., the hardened chunks, in other zones to provide redundancy. In an example of the round robin scheme, Zone A can comprise A1, C4', D3', E2', and F1', which, for example, can provide access to the data of F1 where zone F can become less accessible, to data C4 where zone C becomes less accessible, etc. However, this can result in many redundant copies of chunks in their original format or in the hardened erasure coding format. Where storage space conservation can be desirable, erasure coding can further be employed to conserve storage space while retaining data redundancy. In this example of conventional double encoding, chunks C4', D3', E2', and F1' of Zone A can undergo further erasure coding to decode the chunks into chunks replicating the data of C4, D3, E2, and F1. The replicates of Chunks C4, D3, E2, and F1 in Zone A can undergo erasure encoding, for example an EC(4+2) coding. The EC(4+2) coding can be applied to the data where a data fragment is an whole chunk, e.g., the four data fragments can be C4, D3, E2, and F1, and encoding can generate two coding fragments, e.g., CDEF1 and CDEF2. CDEF2 can be moved to another zone, preferably a zone that does not comprise any of the original chunks C4, D3, E2, or F1. Upon moving, the replicates of C4, D3, E2, or F1 can be deleted from Zone A. It can be seen that a protection set comprising C4, D3, E2, F1, CDEF1, and CDEF2, each in a different zone of the geographically diverse data storage system, can provide protection against the loss of up to two zones, e.g., m=2 in the example EC(4+2) coding because the remaining four or more fragments of the protection set can be employed to decode for the up to two less accessible fragments, where, in this example, the fragments are of chunk size. It is further noted that moving CDEF2 to another zone can, similar to first-tier encoding, be benefited by hardening via erasure coding prior to moving. Following this conventional approach can lead to many encoding operations, decoding operations, copying operations, moving operations, etc., to harden, replicate, and double-erasure encode data, hereinafter double-encoding, into a protection set in a conventional manner.

Reducing the consumption of computer processing resources, e.g., the number of computations, memory, network bandwidth, etc., consumed in supporting double-encoding can be desirable in that it can provide protection via geographic diversity, in a more storage efficient manner than pure replication, similar to conventional double-encoding, but can do this in a more computing resource efficient manner. The presently disclosed commutative erasure coding enables resource efficient double-encoding of data in a geographically diverse data storage system. In an aspect, erasure coding can be performed via a distribution matrix that can be expanded according to a Galois Field (GF) such that bit-matrix operations can be performed via AND operations, typically more efficiently than via XOR operations for an unexpanded distribution matrix. Each element, 'elem', in $GF(2^w)$ can be represented as a row vector V(elem) of 1×w or a matrix M(elem) of w×w, hereinafter 'element expansion matrix', where each element in the new representation is in GF(2). This row vector, V(elem), will be identical to the binary representation of 'elem, and similarly, the $i^{th}$ row in the element expansion matrix will be $V(elem^{2^{i-1}})$. Applying this representation, the distribution matrix of size (k+m)×m can be converted to a an expanded matrix of size w(k+m)× w(m) in GF(2) as a binary matrix. The expanded distribution matrix and use of bit-matrix coding can result in subsequent erasure coding operations being commutative in nature, e.g., for a first-tier encoding, e( . . . ), and a second-tier encoding, E( . . . ), e(E( . . . ))=E(e( . . . )).

The commutative nature of bit-matrix coding via an expanded distribution matrix can reduce the operations employed in the aforementioned conventional double-encoding. As an example, employing commutative encoding for a storage system comprising Zones A to F, as in the conventional double-encoding example hereinabove, Zone A can again comprise chunk A1 that can be first-tier encoded to harden it for replication, e.g., A1'=e(A1). Similarly, hardened chunks can again be generated in other zones, for example, for example, B2', C4', E2', D3', and F1', for zones B to F. At this point, each zone can comprise original data and an encoded data, e.g., Zone A can comprise chunks A1 and A1', etc. The encoded data can again be replicated to another zone, for example in a round robin scheme, etc., which can provide redundant copies, e.g., the hardened chunks, in other zones to provide redundancy. In this example of the round robin scheme, Zone A, as before, can comprise A1, C4', D3', E2', and F1'. As previously noted, this can result in many redundant copies of chunks in their original format or in the hardened erasure coding format. As such, erasure coding can further be employed to conserve storage space while retaining data redundancy. Diverging from the conventional example, commutative encoding can employ chunks C4', D3', E2', and F1' of Zone A without first decoding to replicas of the data of C4, D3, E2, and F1. As such, chunks C4', D3', E2', and F1' in Zone A can undergo further erasure encoding, for example a EC(4+2) coding. Which can generate two coding fragments, e.g., CDEF1' and CDEF2'. CDEF2' is therefore already hardened and can be reliably moved to another zone that does not comprise any of the original chunks C4, D3, E2, or F1, which can yield a protection set comprising C4, D3, E2, F1, CDEF1', and CDEF2', each in a different zone of the geographically diverse data storage system. The example commutative encoding comprises fewer coding/decoding operations to achieve a same or similar result as the conventional double-encoding exemplified hereinabove.

Double-encoding can generally be more storage space efficient than simply duplicating chunks between zones of a geographically diverse data storage system. Commutative encoding can facilitate this efficiently at a lower computing resource commitment. Generally, for a designated level of data robustness in a geographically diverse data storage system without erasure coding, for p+1 geographically distributed zones, there can be manipulation of at least p+1 chunks, for example, of 128 MB each, which can be computer resource intensive where more than a small number of chunks are compromised. With erasure encoding, for example a second-tier encoding, a zone-level encoding, etc., the p+1 chunks can be encoded into fewer coding chunks that can consume less storage space and can be communicated/accessed with less computer resources than the p+1 chunks, for example, in a 4+2 erasure coding scheme, two coding chunks can be distributed to provide data protection rather than replicating and storing greater numbers of replicate chunks. Then, in this example, the coding chunks can be used to recover data rather than having to use the larger number of replicate chunks of a non-erasure coding system. Further, other erasure coding, e.g., a first-tier encoding, a chunk-level encoding, etc., protection is afforded to chunks enabling them to be distributed with greater fidelity via recovery of any portions compromised during distribution among system zones, e.g., compromised segments, etc., of an encoded chunk can be recovered, rather than needing to recover an entire chunk. As an example, a chunk can undergo a first-tier EC(10+2) encoding to enable replication in another zone that can direct employ a second-tier encoding according to the presently disclosed commutative encoding technology, whereby after further distribution and garbage collection, commutative encoding can have a same/similar result as hierarchical encoding, e.g., double-encoding, but with a lower computing resource commitment.

In general, if a geographically distributed data storage system is designated as being able to tolerate a loss of any m zones/clusters/chunks, Then a first level of erasure coding, for example, a zone-level erasure coding scheme, can cause replication of chunks of each to at least m remote zones. As a result, there can be m 'backup copies' of each chunk in other zones. One of these backup copies can be selected as a 'primary' backup copy, which can be employed in encoding according to the erasure coding scheme. Encoding can be performed by any given zone, although typically, first-tier encoding can be performed by a zone sending or receiving data, e.g., a sending zone can generate encoded data, a seconding zone can encode data as it is sent (without creating a local copy), a receiving zone can encode a locally stored copy of received data, a receiving zone can encode data as it is received (without first locally storing a copy of the received data), etc. It can be appreciated that encoding data by the sending zone can protect against damage to the data resulting from network transit, which can be in addition to protecting against damage to the data that can result from storing data at the receiving zone, etc., and, as such, it can typically be preferable to encode/harden data close to the original data. In an aspect, storing distributed protection sets can consume less storage space that storing distributed primary backup chunks and peer backup chunks representing the same data. In an embodiment, per chunk capacity overheads for geographically diverse data storage systems employing erasure coding can be approximated by: Overhead=m/k*'chunk_size'. As an example, for a 10+2 scheme, the overhead can be about $\frac{1}{5}^{th}$ of a 'chunk size', and for a 128 MB chunk, the overhead can be about (0.2)(128 MB)=25.6 MB. In an example, a system that can provide access to data up to the loss of any two zones can provide such protection by having original data in a first zone, a primary replicate in a second zone, and a secondary replica in a third zone, e.g., a protected system stores 300% more data than an unprotected system. However, where the same system employs an example EC(10+2) encoding, the same level of protection as the double replication scheme can occur, but only stores 120% of the data of the unprotected system.

Recovery of less accessible data can be resilient against loss of 1 to m chunks of the corresponding erasure coding tier. Recovery of the inaccessible chunks can be, for example, as follows. For each unavailable chunk, k peer data chunks and corresponding coding chunks, for example of a second-tier encoding scheme, can be used to perform decoding. The resulting data portion(s) can then be stored as replacements for the less accessible chunk(s). It will be noted that this illustrates the recovery of entire less accessible chunks based on entire coding chunks and entire data chunks. It will further be noted that where the number of zones in a geographically diverse data storage system is greater or equal to k+m, and where all the data and coding chunks are effectively distributed among the zones, the distributed storage can be resilient to loss of up to m zones, clusters, or chunks because erasure encoding provides a mechanism to recover compromised chunks.

Erasure encoding for hardening chunks can be applied to chunks resulting from a previous level of erasure encoding, e.g., a second-tier of encoding can be performed on chunks having undergone a first-tier of encoding. This can server to harden a chunk and it is noted that rather than recovering an entire chunk as previously illustrated, data represented in a chunk in a geographically diverse storage system can be accessible without needing to recover the entire chunk content, e.g., recovering a missing data segment, corrupt data segment, etc., of a chunk can be sufficient to enable access to the data represented in the chunk. Recovery of a smaller piece of data can result in higher efficiency, shorter duration of the recovery operations, less burdening of computing resources, etc. As an example, where a chunk that is stored according to a zone-level erasure coding scheme is stored on a hard drive in a data center and a portion of the hard drive is corrupted, the corruption of the hard drive may only affect a small portion of the stored chunk, for example, in a 10+2 second level erasure encoding with 12 segments, loss of $\frac{3}{12}^{th}$s of the chunk can result in the data not being accessible, etc. In this example, rather than recover the entire chunk, it can be sufficient to recover the $\frac{1}{12}^{th}$ of the chunk. Recovering the $\frac{1}{12}^{th}$ of the chunk can result in the chunk having only 2 lost segments, which according to 10+2 erasure encoding, is sufficient to still allow data access, e.g., the 10+2 coding hardens the chunk against loss of up to 2 segments without needing to undergo a recovery from a remotely stored segment from another chunk or zone. In some embodiments, all of the $\frac{3}{12}^{th}$s of the chunk can be recovered so that the chunk does not comprise any inaccessible segments. While this benefit of double-encoding is valuable, the instant disclosure relates to the enabling double-encoding via commutative encoding, as is disclosed herein below.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate chunk recovery via commutative erasure coding in a geographically diverse data storage system, in accordance with aspects of the subject disclosure. System 100 can comprise zone storage components (ZSCs), e.g., first ZSC 110, second ZSC 120, N-th ZSC 130, etc. The ZSCs can communicate with the other ZSCs of system 100, e.g., via communication framework 102, etc. A zone can correspond to a geographic location or region. As such, different zones can be associated with different geographic locations or regions, for example different data centers, different cities, different states, different countries, different hemispheres, etc. A ZSC can comprise one or more data stores in one or more locations. In an aspect, a ZSC can store at least part of a data chunk on at least part of one data storage device, e.g., hard drive, flash memory, optical disk, server storage, etc. Moreover, a ZSC can store at least part of one or more data chunks on one or more data storage devices, e.g., on one or more hard disks, across one or more hard disks, etc. As an example, a ZSC can comprise one or more data storage devices in one or more data storage centers corresponding to a zone, such as a first hard drive in a first location proximate to Miami, a second hard drive also proximate to Miami, a third hard drive proximate to Orlando, etc., where the related portions of the first, second, and third hard drives correspond to, for example, a 'Florida zone', 'Southeastern United States zone', etc. Moreover, in this example, a second ZSC can similarly comprise one or more data storage devices in one or more data storage centers corresponding to a zone, such as a fourth hard drive in a fourth location proximate to Paris, France as part of, for example, a 'European zone', 'French zone', 'central France zone,' 'Paris zone,' etc.

In an aspect, data chunks, e.g., chunk 112 to chunk 116, 122 to 126, 132 to 136, etc., can be replicated in their source zone, in a geographically diverse zone, in their source zone and one or more geographically diverse zones, etc. As an example, a Seattle zone can comprise a first chunk that can be replicated in the Seattle zone to provide data redundancy in the Seattle zone, e.g., the first chunk can have one or more replicated chunks in the Seattle zone, such as on different storage devices corresponding to the Seattle zone, thereby providing intra-zone data redundancy that can protect the data of the first chunk, for example, where a storage device storing the first chunk or a replicate thereof becomes compromised, the other replicates (or the first chunk itself) can remain uncompromised within the zone. In an aspect, data replication in a zone can be via one or more storage devices, e.g., a chunk can be stored on a first data storage device, a second chunk can be stored on a second storage device, and a third chunk can be stored on a third storage device, wherein the first, second, and third storage devices correspond to the first zone, and wherein the first, second, and third storage devices can be the same storage device or different storage devices. Replication of chunks, e.g., the first chunk, as other chunks, e.g., replicating the first chunk as a second chunk, etc., can comprise communicating data, e.g., over a network, bus, etc., e.g., communications framework 102, etc., to other data storage locations, e.g., other storage locations of first, second, third, etc., storage devices and, moreover, can consume data storage resources, e.g., drive space, etc., upon replication. Further access, communication, etc., of chunks can consume or burden computing resources of one or more ZSCs, components of communication framework 102, etc., wherein computing resources can comprise processing of operations on one or more processors, use of one or more memories, use of one or more network resources, etc. As such, determining a number of replicates, selecting a storage scheme, etc., can be based on balancing resource costs, e.g., network traffic, processing time, cost of storage space, etc., against a level of data redundancy, e.g., how much redundancy is needed to provide a level of confidence that the data/replicated data will be available after an event affects one or more aspects of a given data storage system, e.g., a storage device becoming less accessible, network congestion, overburdening of a system processor, failure of a storage location, etc.

In an aspect, system 100 can comprise one or more erasure coding control components (ECCC), e.g., ECCC 108, 118, 128, 138, etc. An ECCC can enable erasure coding of data. In an aspect, an ECCC can facilitate one or more erasure coding schemes, for example, a zone erasure coding scheme that can erasure code at the chunk-level between zones of a geographically diverse data storage system, which can be termed 'GEO erasure coding', a chunk-level erasure coding scheme that can erasure code at the chunk segment level for a chunk in a zone of a storage system, etc., or combinations thereof, in a hierarchical manner, etc. It is noted that the term erasure coding, as used in the instant disclosure, is intended to be inclusive of erasure encoding, erasure decoding, or combinations thereof, unless a more restricted meaning is explicitly or contextually indicated. In an embodiment, an ECCC can interact with the ZSCs of system 100 via communication framework 102 to orchestrate erasure coding scheme(s) for system 100. Further, a first ECCC can orchestrate a first erasure coding scheme, e.g., a zone-level erasure coding scheme, etc., between ZSCs of system 100, while another ECCC, e.g., 108, 118, 128, 138, etc., orchestrates a second erasure coding scheme, e.g., a chunk-level reassure coding scheme, etc., at corresponding ZSCs 110, 120, 130, etc. Other embodiments are readily appreciated and are to be considered within the scope of the present disclosure even where not explicitly recited for the sake of clarity and brevity.

In an aspect, an ECCC can enable encoding according to an erasure coding scheme. In a further aspect, an ECCC can enable decoding based on an erasure coding scheme. As an example, ECCC 118 can interact with other ECCCs, e.g., 128, 138, 108, etc., to enable a zone-level erasure encoding of a chunk of chunks 112 to 116 among ZSCs 110-130, etc., and can further enable a chunk-level encoding of a chunk that was subject to the zone-level erasure encoding, e.g., the chunk-level encoding can encode chunk segments for a chunk that can be an encoded chunk of a zone-level erasure encoding. Accordingly, this example hierarchical erasure encoding can illustrate that the zone-level encoding can, in an embodiment, protect against the loss of a whole chunk, a whole zone, etc., while the chunk-level encoding can, in the embodiment, protect against loss of a chunk segment of a chunk in a zone. Moreover, the example hierarchical erasure encoding can allow for system 100 to consume fewer computing resources than would otherwise be required to recover a whole chunk to replace a compromised chunk, where recovery of a chunk segment of the compromised chunk would be sufficient to enable access to data represented in the compromised chunk.

In an aspect, an ECCC can comprise a commutative bit-level coding component (CBCC), for example, ECCC 108 can comprise CBCC 107. CBCC 107 can facilitate commutative encoding as is disclosed elsewhere herein. In an aspect, commutative encoding can enable resource efficient hierarchical-encoding of data in a geographically diverse data storage system, for example double-encoding of data at both a chunk- and zone-level, etc. In an aspect, erasure coding can be performed via a distribution matrix, which matrix math can employ matrixes, vectors, etc., that can be expanded according to a Galois Field (GF), bit-matrix operations can then be performed via AND operations. Generally, AND operations can be more computationally efficient than XOR operations that can generally be employed with unexpanded distribution matrixes and vectors. As an example, where a GF has an order of ($2^w$), elements of a distribution matrix and of a data fragment vector can be expanded by and element expansion matrix (w×w), e.g., where w=4, for an example EC(12+4) scheme, a corresponding 16×12 distribution matrix (DM), e.g., DM 310, etc., can be expanded to a 64×48 expanded matrix, a 1×12 data fragment vector (DFV), e.g., DFV 320, etc., can be expanded to a 1×48 expanded DFV, etc., and AND operations can be employed in computing a resulting data fragment and coding fragment vector (DCFV), e.g., DCFV 330, etc. It is noted that w can have other values, e.g., 8, 16, etc. It further noted that the GF can also be of another arbitrary value, and the example where the order is of ($2^w$) is illustrated as that is a common order employed in software systems that implement error correction via XOR operations or via AND operations with expansion of elements of a matrix. Where AND operations can be more computationally efficient than XOR operations, expanding inputs into matrix computations based on a given order of a GF, e.g., order=($2^w$), etc., can enable improved computational efficiency. In an aspect, this efficiency improvement can be particularly valuable where many encodings can be performed, e.g., for bit-wise erasure coding, e.g., bit-matrix erasure coding, among multiple chunks of data that can employ orders of magnitude more encoding operations than encoding fragments within a single chunk. Moreover, bit-matrix coding can allow an order of multiple encodings, e.g., via hierarchical encoding, to be performed in a commutative manner, e.g., for a first-tier encoding, e( . . . ), and a second-tier encoding, E( . . . ), e(E( . . . ))=E(e( . . . )). The commutative nature of the order of encoding, via bit-matrix coding corresponding to a determined GF, and the efficiency of the encoding via AND operations can be desirable. Further, commutative encoding can allow for a more compact order of events to achieve a designated level of redundancy for data stored via a geographically diverse data storage system, e.g., there can be fewer overall encoding/decoding operations between only original data and a resulting protection set comprising the original data and redundant data, as is disclosed in more detail elsewhere herein, e.g., FIG. 5, etc.

Figure 2:
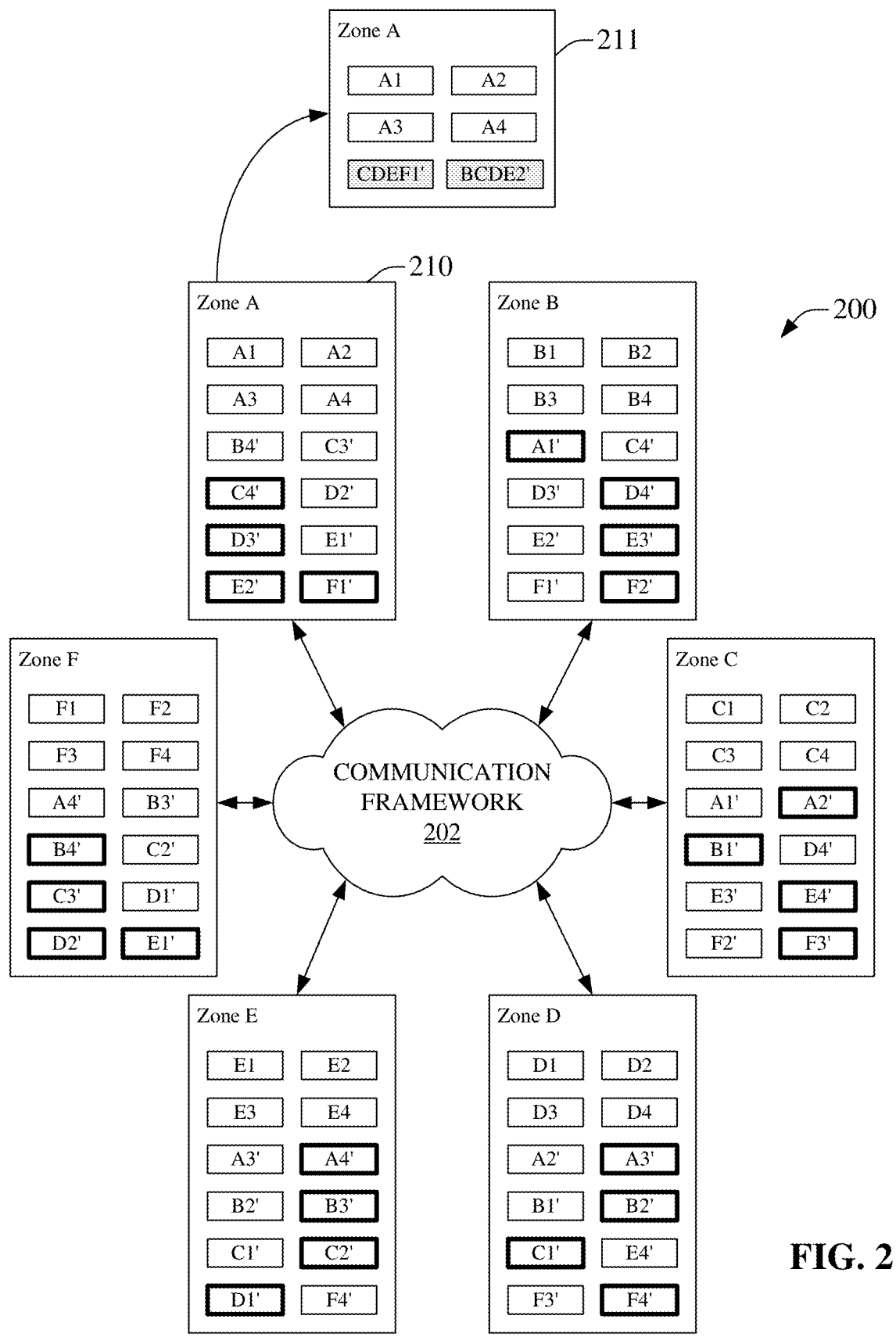
FIG. 2 is an illustration of an example system that can facilitate hierarchical erasure coding of data in a geographically diverse storage system, in accordance with aspects of the subject disclosure.

FIG. 2 is an illustration of a system 200, which can facilitate hierarchical erasure coding of data in a geographically diverse storage system, in accordance with aspects of the subject disclosure. System 200 can comprise zones A-F, e.g., six zones. It is noted that Zone A at 211 can be an evolution of Zone A at 210 as will be explained in further detail herein below. Each of zones A-F can store data chunks, e.g., Zone A can store chunks A1-A4. Moreover, each of zones A-F can store other chunks, for example, replicates of chunks from other zones, e.g., Zone A can store chunks B4', C3', C4', . . . , F1', etc., which can correspondingly be first-tier encoded replicates of B4, C3, C4, . . . , F1, etc., from other zones, e.g., Zones B-F, etc., e.g., encoding the replicate can 'harden' the replicate as is disclosed elsewhere herein and, as such, it can be desirable to first-tier encode the replicate as part of distributing the replicate to other zones of system 200.

In an aspect, some of the replicates can be primary replicates, e.g., those indicate with a thickened border, while secondary, tertiary, etc., replicates can be stored at other zones, e.g., in Zone A, a replicate C4' with a bold border can be a primary replicate of chunk C4 from Zone C, and Zone B can store a secondary replicate of C4, e.g., C4' without a bold border, etc. Additionally, each zone can store coding chunks for the first-tier encoded replicates, which are not illustrated for the sake of clarity and brevity, but see shaded chunks, e.g., shaded chunk CDEF1, etc., of Zone A in system 200, etc., that can be a second-tier encoding code chunk as is explained in detail elsewhere herein. A code chunk can result from encoding of data chunks, or portions of data chunks, e.g., a data fragment can be part of chunk, a chunk of chunks, a group of chunks of groups of chunks, chunks of a zone among zones, etc.

In an embodiment, a data chunk can be used to directly store user provided data, e.g., chunks A1, A2, A3, A4, etc., of Zone A in system 200, while a code chunk can comprise data that can be used via erasure code decoding of available data to generate other data, e.g., remaining data chunks can be used to decoded and recover lost chunks. Data fragments/chunks, code fragments/chunks, etc., can then be distributed among the zones in nearly any manner. As can be observed in the illustrated example of a round-robin distribution scheme, Zone A can replicate its chunk A1 to Zone B and Zone C; chunk A2 to Zone C and Zone D; chunk A3 to Zone D and Zone E; and chunk A4 to Zone E and Zone F. Similar processes can be undertaken in this illustrated example for the remainder of the zones. In an aspect, storage of a data chunk and a code chunk is generally indistinguishable, which, in some embodiments, can allow for a second layer of erasure coding to be performed on code chunks and corresponding data chunks. As such, replication of chunks and distribution of the hardened replicates can be illustrated by Zone A 210 to zone F, e.g., excluding Zone A 211. It can readily be observed that Zone A 210 employing hardened replication, e.g., only using a first-tier encoding to harden chunks for replication in other zones, can result in Zone A 210 storing 12 chunks of data, and each of Zones B-F similarly storing 12 chunks, to enable protection of data in system 200 against any two chunks becoming less accessible. This can be understood by stating that if chunk A1 of Zone A 210 and chunk A1' of Zone C each become less accessible, the data represented in chunk A1 can be accessed via chunk A1' of Zone B. This example can be extended to any chunk of any of the zones in Zone A 210, Zone B, . . . , or Zone F. However, while protected well, this replication technique consumes 300% of the storage space used to store the original data, e.g., there are 24 chunks of original data in the ring of zones A-F (excluding the elsewhere explained permutation at 211), but system 200 needs to store at least 72 chunks of data to provide the noted redundancy.

As such, A more efficient use of storage space that still provides the noted data protection can be desirable. Accordingly, a second-tier encoding can be performed to reduce the consumed storage space while still retaining the noted redundancy. Inspecting Zone A 210, it can be observed that four primary hardened replicates for other zones can be stored therein to provide replicate scheme redundancy. These primary hardened replicates can be treated as data fragments, albeit chunk-sized data fragments, that undergo encoding, e.g., a second-tier encoding, to conserve storage space. For an example EC(4+2) scheme, chunks C4' to F1' of Zone A 210 can be encoded to generate two corresponding coding chunks, e.g., CDEF1' (later illustrated at Zone A 211) and CDEF2' (not illustrated for clarity and brevity). These code chunks can allow recovery, e.g., via decoding, to recover a less accessible chunk of C4' to F1'. However, keeping both code chunks at the same zone can subject both code chunks to any reduced access event. Accordingly, the code chunks can be distributed to improve the resilience of the protection set comprising chunks C4, D3, E2, F1, CDEF1', and CDEF2'. Typically this distribution seeks to spread chunks so that more than one chunk is not compromised for a reduced access event. Whereas chunks C4, D3, E2, and F1 can already be distributed among Zones C, D, E, and F correspondingly, this leaves Zones A and B to spread coding chunks CDEF1' and CDEF2' among. In this example, CDEF2' can be replicated to Zone B, leaving Zone A with CDEF1'. Similar processes can be performed for the other zones, again not illustrated for clarity and brevity. Where the chunks have been distributed, cleanup of extraneous chunks can be undertaken, e.g., the primary and secondary hardened replicates can be removed from the zones because the protection sets with the code chunks, e.g., CDEF1', etc., can now provide data protection. The cleanup can result in Zone A at 211, e.g., sorting the original data chunks and two coding chunks corresponding to two protection sets for data of other zones. As such, Zone A 211 can provide the same protection as Zone A 210 but with much reduced data storage, e.g., storing six chunk rather than 12 chunks. Zones B-F can similarly each store six chunks rather than each storing 12 chunks, again not illustrated for clarity and brevity.

In an aspect, the following notation can be employed: Di (e.g., D1, etc.) can be data chunks, e.g., chunks with user data; Ci (e.g., C1, etc.) can be coding chunks for corresponding data chunks Di; e( . . . ) can be a first-level encoding function; E( . . . ) can be a second-level encoding function; and Di' and Ci' can correspondingly be the encoded chunks for Di and Ci. As such, for conventional double-encoding in general, original data of a chunk can be hardened, e.g., encoded, for replication. The hardened replicate chunk can then be decoded into a replicate data chunk. This replicate data chunk can then be encoded with other data chunks to yield coding chunks. The coding chunk can then be hardened, e.g., via further encoding, for replication to other zones as part of distributing the chunks of a resulting protection set. The hardened coding chunks can then be decoded to yield coding chunks at their destination zones. Moreover, after the distribution, extraneous chunks can be cleaned up to reduce consumed storage space while preserving the example protection sets. This can be viewed as Di'=e(Di), then Di', e.g., the first-tier encoding of Di, can be replicated from Zone A 210 to Zone B, e.g., round-robin style, etc. Similar process scan occur for Zones B to F. Accordingly, after hardening and replication, Zone A at 210, can comprise hardened replicate data Di', for example C4', D3', E2', F1', B4', C3', etc. At the Zone A 210, Di' can be decoded back to Di, not illustrated for clarity and brevity, to Di, e.g., D3'→D3, etc. A second-tier encoding can be undertaken with the decoded replicates, e.g., Ci=E(Di). As an example, in Zone A 210, hardened replicate chunks C4', D3', E2', and F1', can be decoded to replicate chunks in Zone A 210 as rC4, rD3, rE2, and rF1, which replicate chunks can then be second-tier encoded to generate m code chunks, e.g., Ci=E(rC4, rD3, rE2, rF1), e.g., in an EC(4+2), CDEF1 and CDEF2 can result from E(rC4, rD3, rE2, rF1), leading to a protection set comprising rC4, rD3, rE2, rF1, CDEF1, and CDEF2. The chunks comprising the protection set can then be hardened to facilitate their distribution among the storage system zones as disclosed herein. Cleanup can then be undertaken. In an aspect, the distributed code chunks of the protection set can, in some embodiments be decoded at their destination zone, although this can be an extraneous step where they would typically be re-hardened to accommodate replication to enable decoding for recovery of less accessible data at a future time. Accordingly, to distribute a protection set as seen in Zone A 211 via conventional double-encoding, replication of chunks can undergo a first-tier encoding, a transfer, a decoding, a second-tier encoding, another first tier encoding of the chunks of the second-tier encoding, distribution of the hardened chunks of the protection set, clean up, and a possible second decoding of the remaining distributed and hardened chunks of the protection set, see FIG. 5 from 510 to 570 via dashed arrows.

In contrast, by observing that encoding can be commutative via bit-matrix operations for some GF orders, the count of operations can be significantly reduced and allow for much more efficient use of computing resources of a geographically distributed data storage system. Where the first-tier and second-tier encoding are commutative due to expanding matrix mathematics inputs corresponding bit-matrix operations for a distribution matrix and data fragment matrix, it can be observed that e(E(Di))=E(e(Di)). Accordingly, C1'=e(C1)=e(E1(D1, D2, D3, D4))=E1(e(D1), e(D2), e(D3), e(D4)))=E1(D1', D2', D3', D4'), and
C2'=e(C2)=e(E2(D1, D2, D3, D4))=E2(e(D1), e(D2), e(D3), e(D4)))=E2(D1', D2', D3', D4'.

As such, under commutative encoding, a first-tier encoding can hardened data to be replicated Di'=e(Di), the hardened data can then be second-tier encoded directly after distribution, e.g., Ci'=E(Di'). This can be re-written as Ci'=E(e(Di)), which can be re-written as Ci'=e(E(Di)) due to the commutative nature of bit-matrix coding. Thus, where Ci=E(Di), this can further be rewritten as Ci'=e(Ci). Accordingly, the hardened primary chunks at Zone A 210, e.g., C4' to F1', can be directly second-tier encoded via bit-matrix operations, to CDEF1' and CDEF2', yielding a protection set of chunk C4 in Zone C, chunk D3 in Zone D, chunk E2 in Zone E, chunk F1 in Zone F, code chunk CDEF1' in Zone A 211, and, after distribution of the second coding chunk, code chunk CDEF2', in Zone B, for example, see FIG. 5 from 510 to 570 via the solid arrows. It can readily be appreciated that this is a more direct route to a viable protection set that can be the same as, or similar to, that yielded from the more computationally intensive conventional double-encoding described above.

Figure 3:
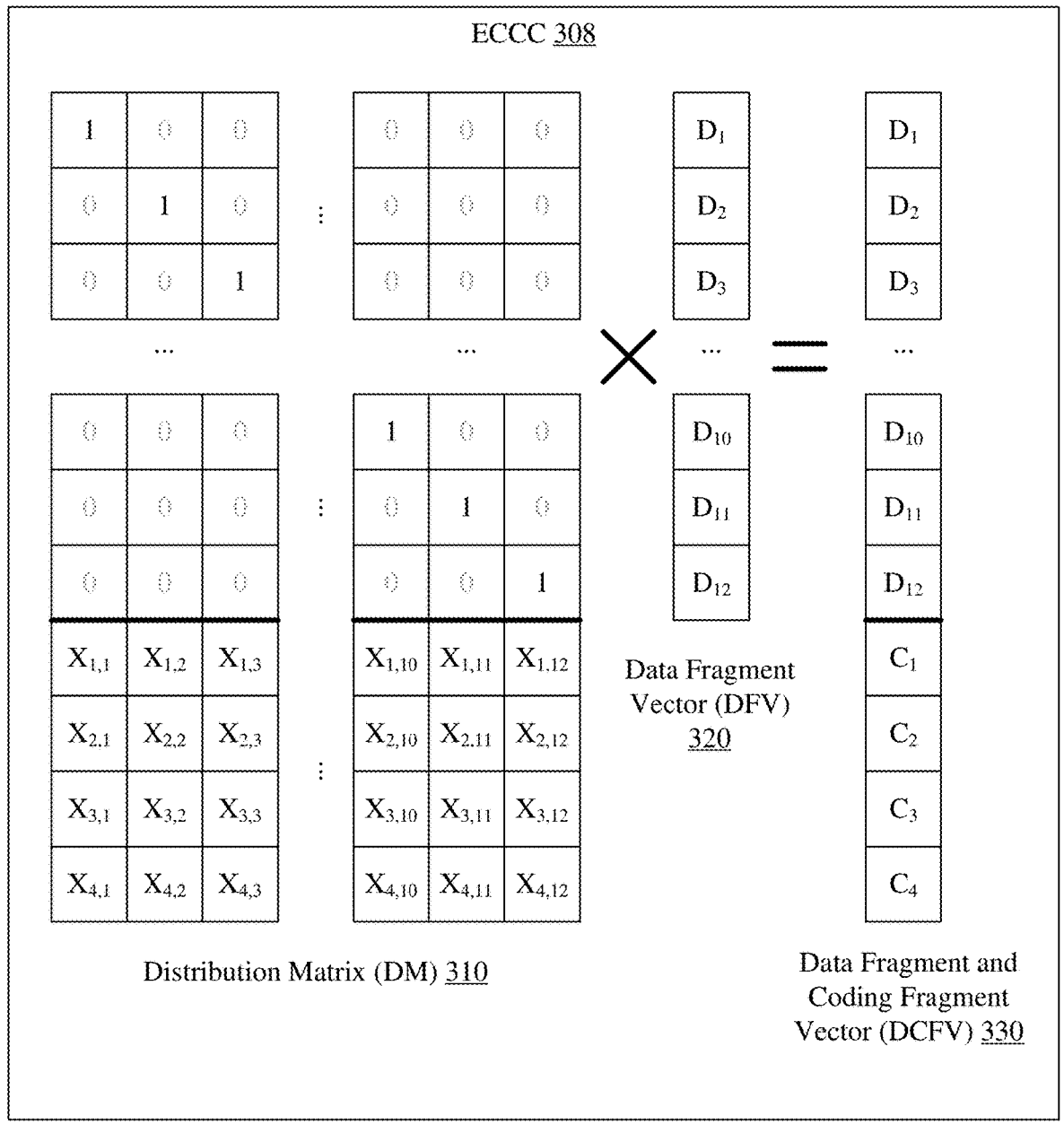
FIG. 3 is an illustration of an example system that can enable first-tier erasure coding of data in a geographically diverse storage system, in accordance with aspects of the subject disclosure.

FIG. 3 is an illustration of a system 300, which can enable first-tier erasure coding of data in a geographically diverse storage system, in accordance with aspects of the subject disclosure. System 300 can comprise ECCC 308 that can be the same as or similar to ECCC 108, 118, 128, 138, etc. ECCC 308 can perform matrix operations as part of reassure encoding/decoding. In an aspect, erasure coding can be performed via matrix operations employing, for example, distribution matrix (DM) 310, data fragment (DF) vector (DFV) 320, a data fragment and coding fragment vector (DCFV), etc. DM 310 can be a matrix that of size (k+m)×k. DM 310 can be multiplied by DFV 320 that can be of length k. In an aspect, DFV 320 can be regarded as a matrix of size 1×k. The multiplication can yield DCFV 330 that can be a vector of length k+m, which, similar to DFV 320, can be regarded as a matrix, but of 1×(k+m) in size. It can be observed for example system 300 that the first k rows of DM 310 can comprise a k×k identity matrix, while the bottom m rows of DM 310 can comprise a coding matrix (CM) having Coefficients $X_{i,j}$ that can be defined in a manner corresponding to a selected erasure coding algorithm that will be employed in the encoding/decoding of data represented via DFV 320. During an encoding, DM 310 can be multiplied by DFV 320 and can produce a product vector, e.g., DCFV 330, that can contain both the data and the coding fragments. Comparing, for example, DFV 320 with DCFV 330, the first k rows can be the same, e.g., representing the data fragments because the data fragments multiplied by the identity matrix yields the same values, while the bottom m rows can be coding fragments resulting from matrix multiplication of the data fragments from DFV 320 with the coding matrix of DM 310. It can be appreciated that the values of DFV 320 can be directly read from DCFV 330 by simply capturing the values of the first k rows of DCFV 330. In an aspect, when some fragments are lost, decoding can be undertaken to recover lost fragments via employing DM 310 and DCFV 330 to get DFV 320.

In an aspect, a Galois Field (GF), e.g., a fixed field, can be used to implement the Reed-Solomon erasure coding. Theoretically, any GF order can be used for this purpose, however, actual implementation in real systems can typically employ a GF with field with an order of 2^w, where w is can often be designated as 4 (a popular designation), 8, 16, etc., as this order of GF readily lends itself to binary systems, e.g., bit-wise erasure coding. For a GF of 2^w an ADD operation can be implemented via a single XOR operation. An XOR operation can be emulated via NAND operations, because $Q=(A \oplus B)=A \cdot \bar{B}+\bar{A} \cdot B$, and a NAND operation can be based on NOT'ing an AND operation, e.g., NOT($a_1$ AND $a_2$ AND ... AND $a_n$). As such, a GF of 2^w can be regarded as enabling a bit-matrix encoding approach via XOR operations or, where a input matrixes are expanded/modified to apply a NOT operation to each element of an input matrix, e.g., the input matrix is expanded in a specific way via a w×w element expansion matrix, for example where w=4→ (4×4) element expansion matrix, where each element of the element expansion matrix is appropriately either 0 or 1, then the bit-matrix operation can be performed via AND operations. In this aspect, an example DM 310 for a EC (12+4) scheme can comprise a 12×12 identity matrix and a 4×12 coding matrix as illustrated in example system 300. DM 310 can be expanded by applying the w×w element expansion matrix and can result in an expanded matrix that can be 64×48 in size, comprising a 48×48 identity matrix and a 16×48 binary coding matrix. Similarly, DFV 320 can be expanded such that the example 12 elements transforms into a binary data fragment vector of 48 elements (12×4=48). Expanding DM 310 and DFV 320 into binary forms via applying an element expansion matrix can enable use of GF(2) arithmetic, e.g., AND operations, rather than GF(2^w) arithmetic, e.g., XOR operations. This can allow for AND'ing the expanded binary DM with the expanded binary DFV, rather than multiplying DM 310 and DFV 320, to generate DCFV 330. This can be more computationally efficient, and in some embodiments that can have comprise many encoding operations, spending time to apply the element expansion matrix to the distribution matrix and the data, e.g., a group of DFVs, to allow AND'ing, can be much more computationally efficient than XOR'ing an unexpanded DM with the example group of DFVs.

Figure 4:
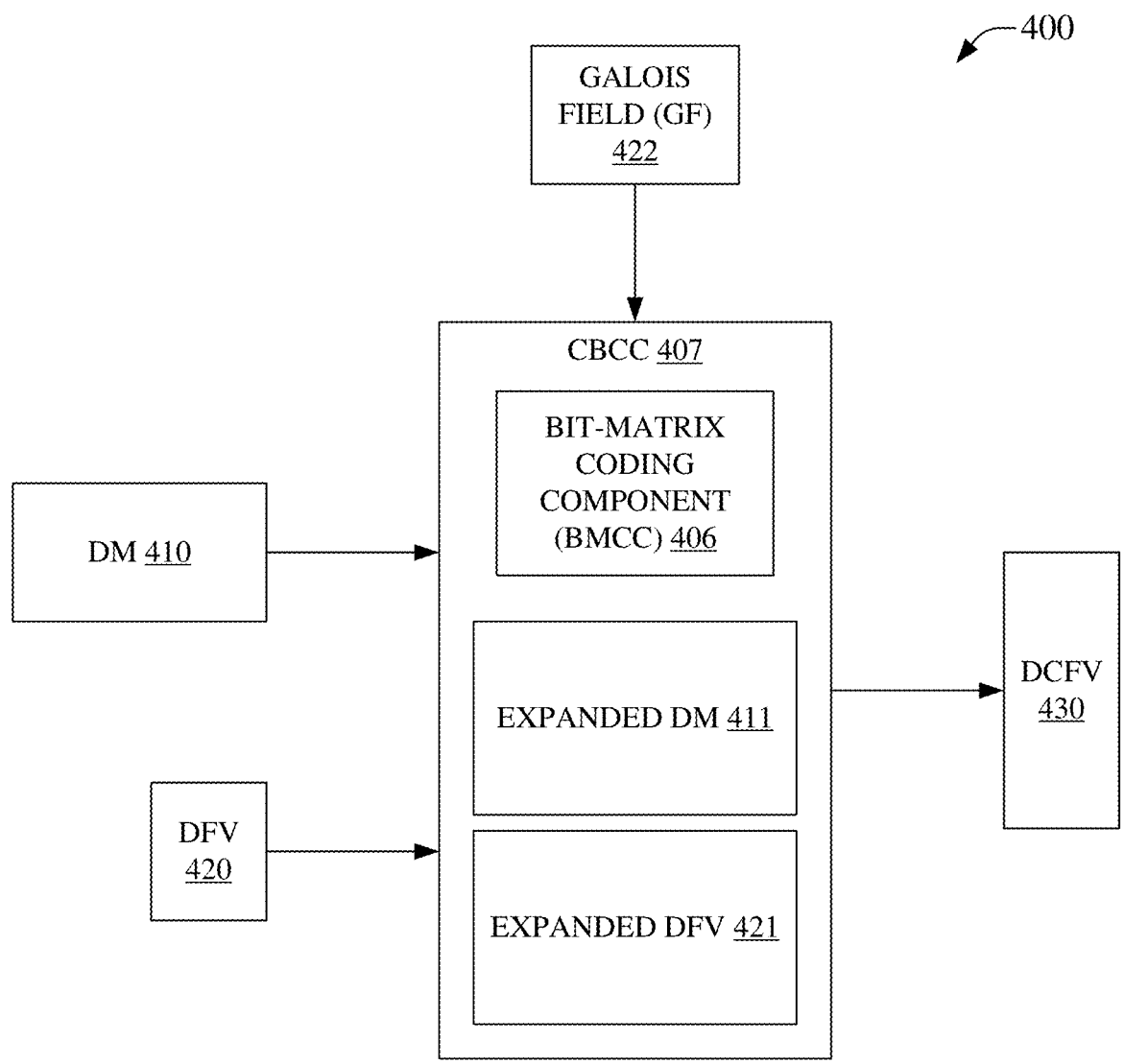
FIG. 4 illustrates an example system that can facilitate second-tier erasure coding of data in a geographically diverse storage system, in accordance with aspects of the subject disclosure.

FIG. 4 is an illustration of a system 400, which can facilitate second-tier erasure coding of data in a geographically diverse storage system, in accordance with aspects of the subject disclosure. In an embodiment, the second-tier erasure coding can be facilitated via bit-matrix operations. System 400 can comprise CDCC 407 that can receive GF 422, DM 410, and DFV 420, and can generate DCFV 430. In an aspect, CDCC 407 can comprise bit-matrix coding component (BMCC) 406 that can apply an element expansion matrix based on a received GF, e.g., GF 422. As an example, where GF(2^w) is received, a (w×w) element expansion matrix can be applied to received DM 410 and DFV 420. This can serve to expand the matrix and vector to an expanded binary matrix, e.g., expanded DM 411, and expanded binary vector, e.g., expanded DFV 421. As an example, for DM 410 comprising a 2×6 coding matrix, e.g., corresponding to an EC(4+2) scheme, and a w=4, the resulting expanded binary coding matrix can be of size 8×24, and similarly, a DFV of length 4, also corresponding to the EC(4+2), can be expanded to vector of length 8.

CBCC 407, for example via BMCC 406, can perform bit-matrix operations to generate DCFV 430 based on expanded DM 411 and expanded DFV 421. As an example, for w=2, GF(2^w) can reduce to GF(2) in correlation with BMCC 406 applying the (w×w) element expansion matrix to the inputs DM 410 and DFV 420. Accordingly, GF 2 can enable AND'ing matrix elements, in contrast to XOR'ing elements of matrixes under GF(2^w) prior to applying the element expansion matrix. DCFV 430 can therefore be generated with more efficient use of computing resources, particularly where expanded DM 411 can be determined once for determining DCFVs for a large group of input DFVs, e.g., where a DFV can comprise chunk-sized fragments, use of bit-matrix calculations can be significantly more efficient than standard matrix calculations.

Figure 5:
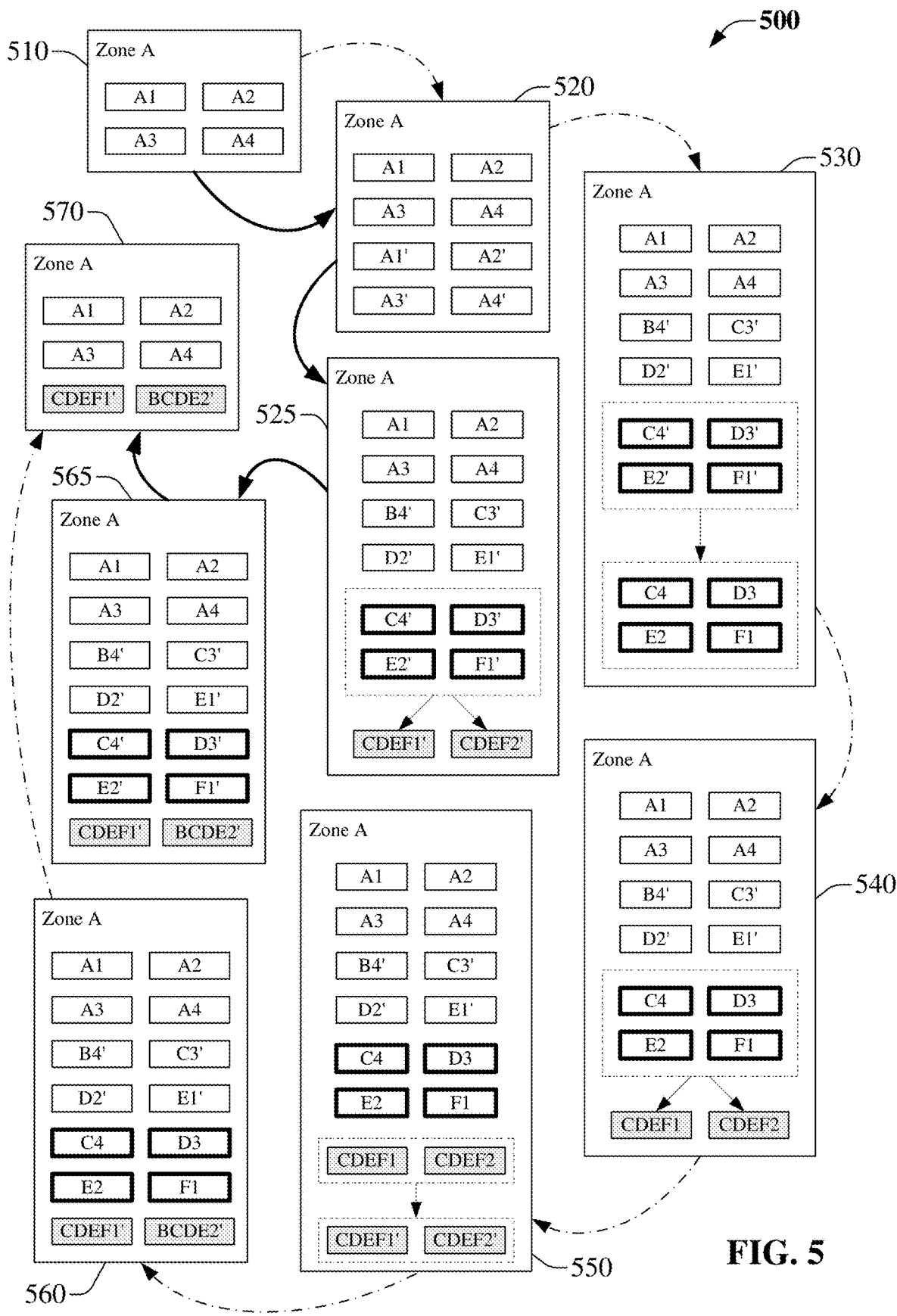
FIG. 5 is an illustration of example changes to data stored via a zone of an example system, wherein the example system can facilitate commutative erasure coding of data in accordance with aspects of the subject disclosure.

FIG. 5 is an illustration of example changes to data stored via a zone of an example system 500, wherein the example system can facilitate commutative erasure coding of data in accordance with aspects of the subject disclosure. System 500 can comprise Zones A to F, etc., for example, as illustrated in FIG. 2, etc. Snapshots of data stored in Zone A of system 500 can illustrate differences between conventional double-encoding and the presently disclosed commutative encoding of data that can correspond to improved storage efficiency, reduced consumption of computing resources, etc. Zone A at 510 can store data comprising four data chunks A1 to A4. At 520, Zone A can comprise a first-tier encoding of data chunks A1 to A4, illustrated as A1' to A4'. Similar operations can occur in unillustrated Zones B to F, etc. It is noted that both conventional double-encoding and the presently disclosed commutative encoding can undergo these operations as is indicated for the conventional double-encoding by the dashed arrow from 510 to 520, and for the commutative encoding by the solid arrow from 510 to 520.

Zone A of system 500 can undergo operations that diverge at 520 for each of the conventional double-encoding and the disclosed commutative encoding technology. Conventional double-encoding can advance to 530 where Zone A is illustrated as comprising primary and secondary replicates from other zones of system 500. Whereas replication between zones can be non-trivial, e.g., replication can result in parts of a replicated chunk becoming less accessible, the replicates have each undergone first-tier encoding to harden them against said potential losses of access to any portions of the chunk that can occur during replication between zones of system 500. In an aspect, the first-tier encoding can be based on one or more selected EC schemes, e.g., some chunks can be first-tier encoded according to an EC(12+4) scheme, an EC(10+2) scheme, an EC(4+2) scheme, etc. As such, at 530, Zone A can comprise hardened replica chunks B4', C3', D2', E1', C4', D3', E2', and F1'. Similar operations can occur in other zones of system 500. Moreover, at 530, the hardened primary replicates can be decoded to prepare these chunks for second-tier encoding. The decoding can result in generating replicate chunks C4, D3, E2, and F1 in Zone A at 530. A similar operation can also be performed at other zones of system 500.

In contrast, commutative encoding can proceed from 520 to 525, wherein primary and secondary replicates from other zones of system 500 can also be now stored in Zone A. Again, where replication between zones can be non-trivial, the replicates can be hardened in Zone A at 525, e.g., they can have each undergone first-tier encoding to harden them, e.g., some chunks can be first-tier encoded according to an EC(12+4) scheme, an EC(10+2) scheme, an EC(4+2) scheme, etc. As such, at 525, Zone A can also comprise hardened replica chunks B4', C3', D2', E1', C4', D3', E2', and F1'. Again, similar operations can occur in other zones of system 500. However, unlike conventional double-encoding, Zone A at 525 can comprise two coding chunks based on a second-tier encoding of the hardened primary replicate chunks, e.g., generating CDEF1' and CDEF2'. This generating can be performed by a CBCC, e.g., CBCC 107, 407, 607, etc., for example via a BMCC 406, 606, etc., based on bit-matrix coding as disclosed elsewhere herein. Decoding of chunks C4', D3', E2', and F does not need to be performed as in conventional double-encoding at 530 because of the commutative nature of bit-matrix coding identified in the presently disclosed subject matter.

Returning to the conventional double-encoding technique, which can advance from 530 to 540, Zone A can comprise coding chunks CDEF1 and CDEF2 generated from a second encoding of the replicated chunks C4, D3, E2, and F1 in Zone A at 530. At 540, a protection set can comprise original chunks C4, D3, E2, and F1 stored in their respective zones as well as coding chunks CDEF1 and CDEF2 of Zone A. The conventional technique can then perform, at 550, another encoding of code chunks CDEF1 and CDEF2 to harden them against possible losses during distribution of the chunks comprising the protection set at 540. As such, at 550, Zone A can comprise CDEF1' and CDEF2'. At 560, Zone A can comprise coding chunk BCDE2' that can be received from another zone in accord with each zone correspondingly distributing chunks of protection sets relative to those other zones. Accordingly, zones of system 500 can comprise original data chunks, hardened coding chunks distributed in a manner that facilitates data redundancy, as well as numerous redundant chunk replicas in both hardened and unhardened states. For example, at 560, Zone A can comprise original chunks A1 to A4, hardened coding chunks CDEF1' and BCDE2', and redundant chunk replicates B1', C3', . . . , E2, F1 etc. In an aspect the other zones will comprise chunks generated in a similar manner. Conventional double-replication can then perform garbage collection to result in Zone A at 570 that can comprise original data chunks A1 to A4 and hardened coding chunks CDEF1' of a first protection set and DCDE2' of a second protection set. Again, other zones, having undergone similar operations can comprise corresponding data chunks and coding chunks that, in total, can be appreciated as providing redundancy for chunks A1-A4 through F1-F4, such as may be illustrated in system 200.

Returning to the presently disclosed commutative encoding, rather than proceed along the dashed arrows of the conventional double-encoding, e.g., 520→530→54→550→560→570, system 500 can advance from Zone A at 525 to Zone A at 565, where the hardened code chunks generated in the zones at 525 can be distributed according to the relative protection set. Similar to the conventional double-encoding at 560, Zone A at 565 can comprise hardened code chunk CDEF1' of a first protection set and BCDE2' of a second protection set. After garbage collection, the commutative encoding can advance to 570 where Zone A can comprise the same, or similar, chunks as the conational double-encoding, e.g., original data chunks A1 to A4 and hardened coding chunks CDEF1' of a first protection set and DCDE2' of a second protection set. Again, other zones, having undergone similar operations can comprise corresponding data chunks and coding chunks that, in total, can be appreciated as providing redundancy for chunks A1-A4 through F1-F4, such as may be illustrated in system 200.

System 500 can clearly illustrate that commutative encoding can comprise far fewer encoding/decoding operations to achieve a same/similar result as conventional double-encoding of data. As such, the presently disclosed commutative encoding can be more computer resource efficient than conventional techniques. Moreover, where commutative encoding can employ bit-matrix operations by shifting to a lower GF order, e.g., GF(2) rather than a GF($2^w$), etc., this can further reduce computing resource consumption over conventional techniques. This further reduction in resource consumption can be magnified in situations where many encodings are occurring, for example in encoding between chunks from different zones as compared to encoding data within a single chunk, etc.

Figure 6:
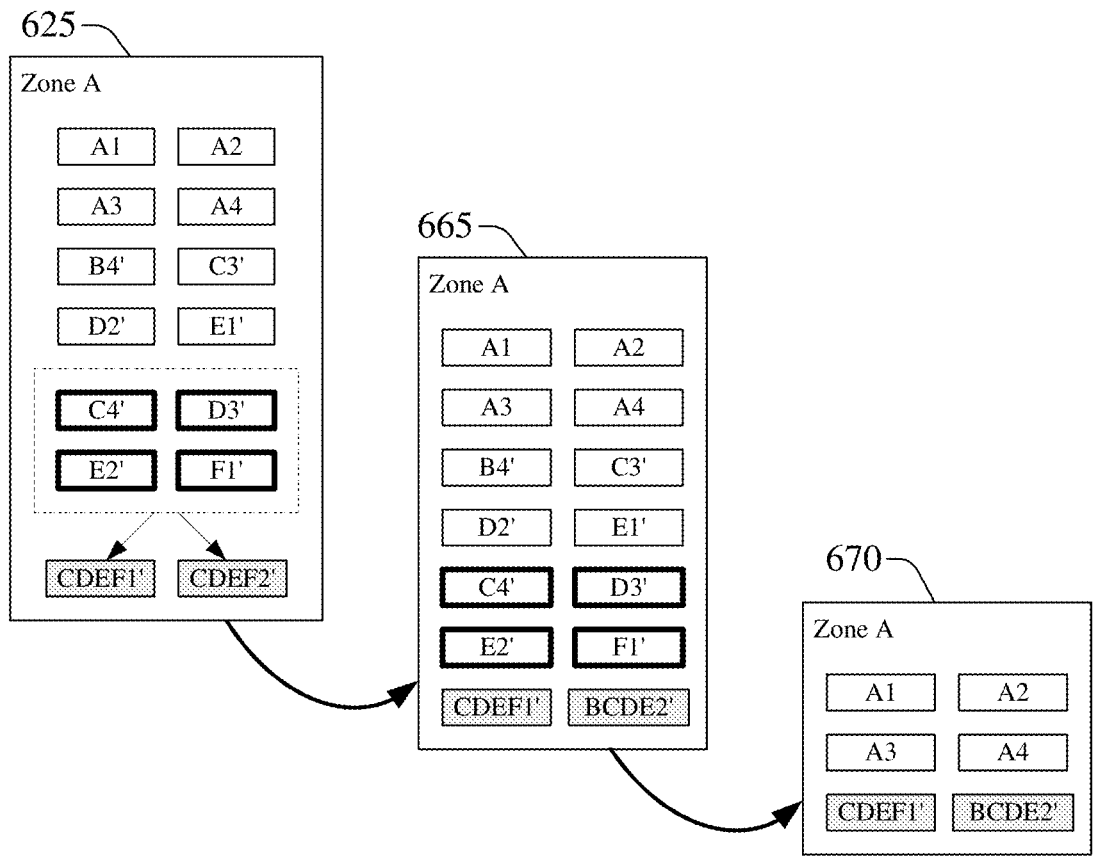
FIG. 6 is an illustration of an example system that can facilitate commutative erasure coding of data, in accordance with aspects of the subject disclosure.
Figure 6:
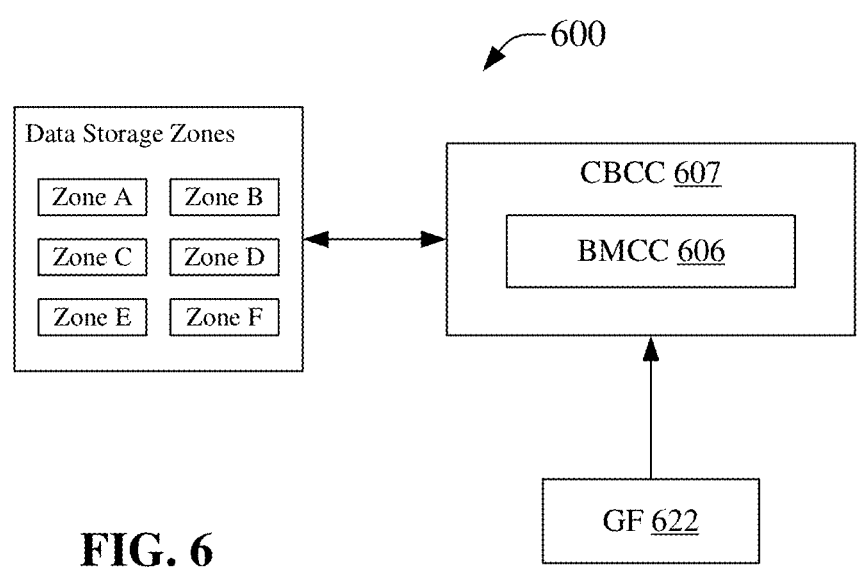

FIG. 6 is an illustration of a system 600, which can facilitate commutative erasure coding of data, in accordance with aspects of the subject disclosure. System 600 can comprise Zones A to F that can store data chunks similar to, or the same as, those illustrated for system 200 in FIG. 2, e.g., each zone can comprise four original data chunks and a plurality of hardened replicate chunks from other zones, e.g., chunks that each underwent a first-tier encoding to harden them for distribution to other zones of system 600. The hardened primary replicates can be directly second-tier encoded according to commutative encoding to generate hardened coding chunks, e.g., CDEF1' and CDEF2' as illustrated at 625 for Zone A of system 600. The commutative encoding can be facilitated by BMCC 606 of CBCC 607 of system 600.

In an aspect, BMCC 606 can expand a distribution matrix, e.g., DM 410, etc., and a data fragment vector, e.g., DFV 420, etc., based on received Galois Field 622. This can enable bit-matrix operations that can result in generating a data fragment and coding fragment vector, e.g., DCFV 430, etc. The commutative nature of the bit-matrix operations allows for direct second-tier encoding of the first tier encoded replicates to result in a hardened coding chunk, in a manner that can be much more efficient than in conventional double-encoding techniques, as is disclosed elsewhere herein.

At 665, distribution of chunks comprising protection sets resulting from commutative encoding of respective chunks of the data storage zones can result in Zone A comprising coding chunk BCDE2' of another protection set. After cleanup, Zone A, at 670, can comprise chunks A1-A4, CDEF1' of a first protection set, and BCDE2' of a second protection set. Although not illustrated, Zone B can, at a similar point, comprise B1 to B4, ADEF1' of a third protection set, and CDEF2' of the first protection set. Similarly in Zone C, can comprise C1 to C4, ABEF1' of a fourth protection set, and ADEF2' of the third protection set. Likewise in Zone D, there can be chunks D1 to D4, ABCF1' of a fifth protection set, and ABEF2' of the first protection set. Accordingly in Zone E, chunks E1 to E4, ABCD1' of a sixth protection set, and ABCF2' of the fifth protection set. Additionally in Zone F, chunks F1 to F4, BCDE1' of the second protection set, and ABCD2' of the sixth protection set. It is noted that these examples are based on an example round-robin distribution of chunks of the noted protection sets and the disclosed subject matter is not limited to this particular example, e.g., other chunk distributions are within the scope of the disclosed subject matter but discussion of this aspect is irrelevant to the commutative encoding technology disclosed in the instant application.

Figure 7:
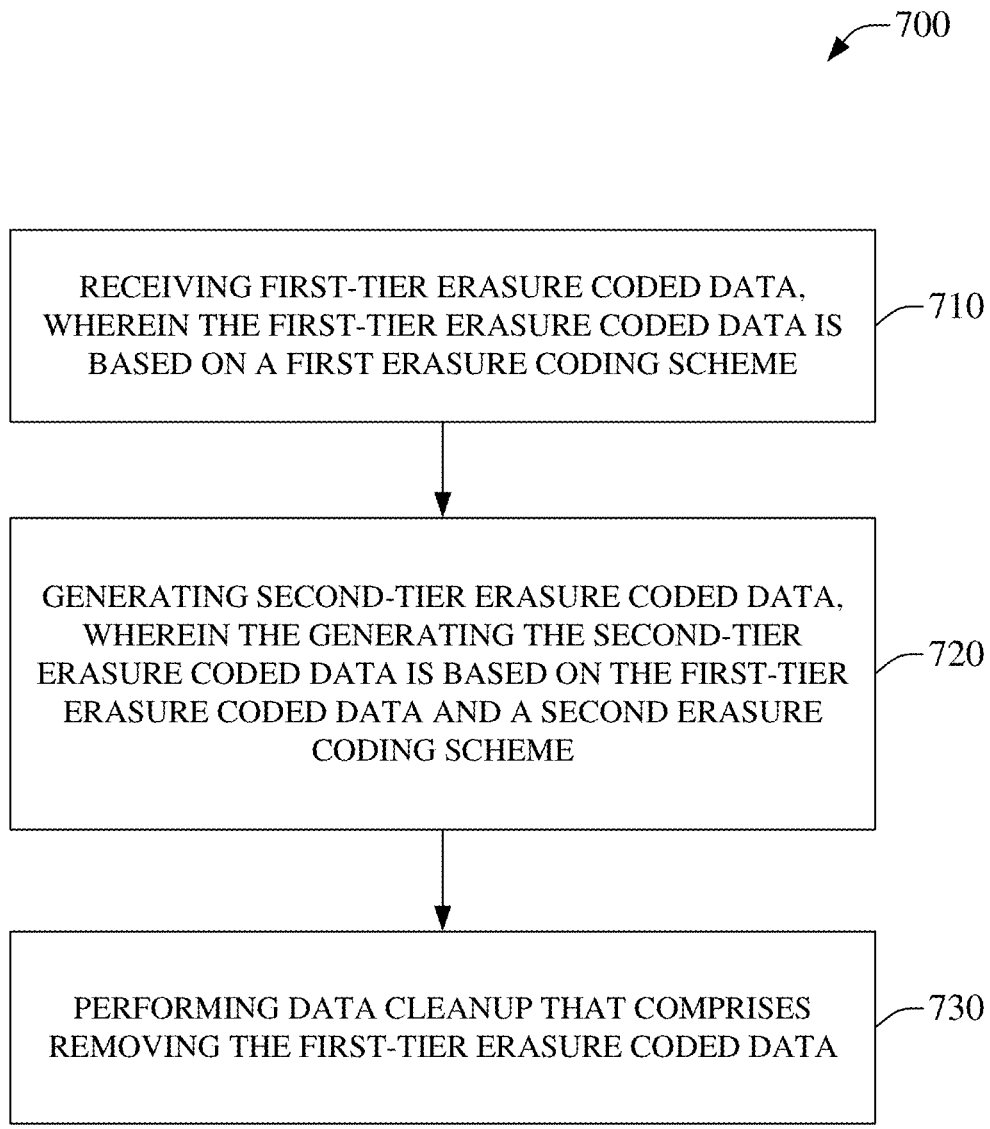
FIG. 7 is an illustration of an example method facilitating commutative erasure coding of data, in accordance with aspects of the subject disclosure.
Figure 8:
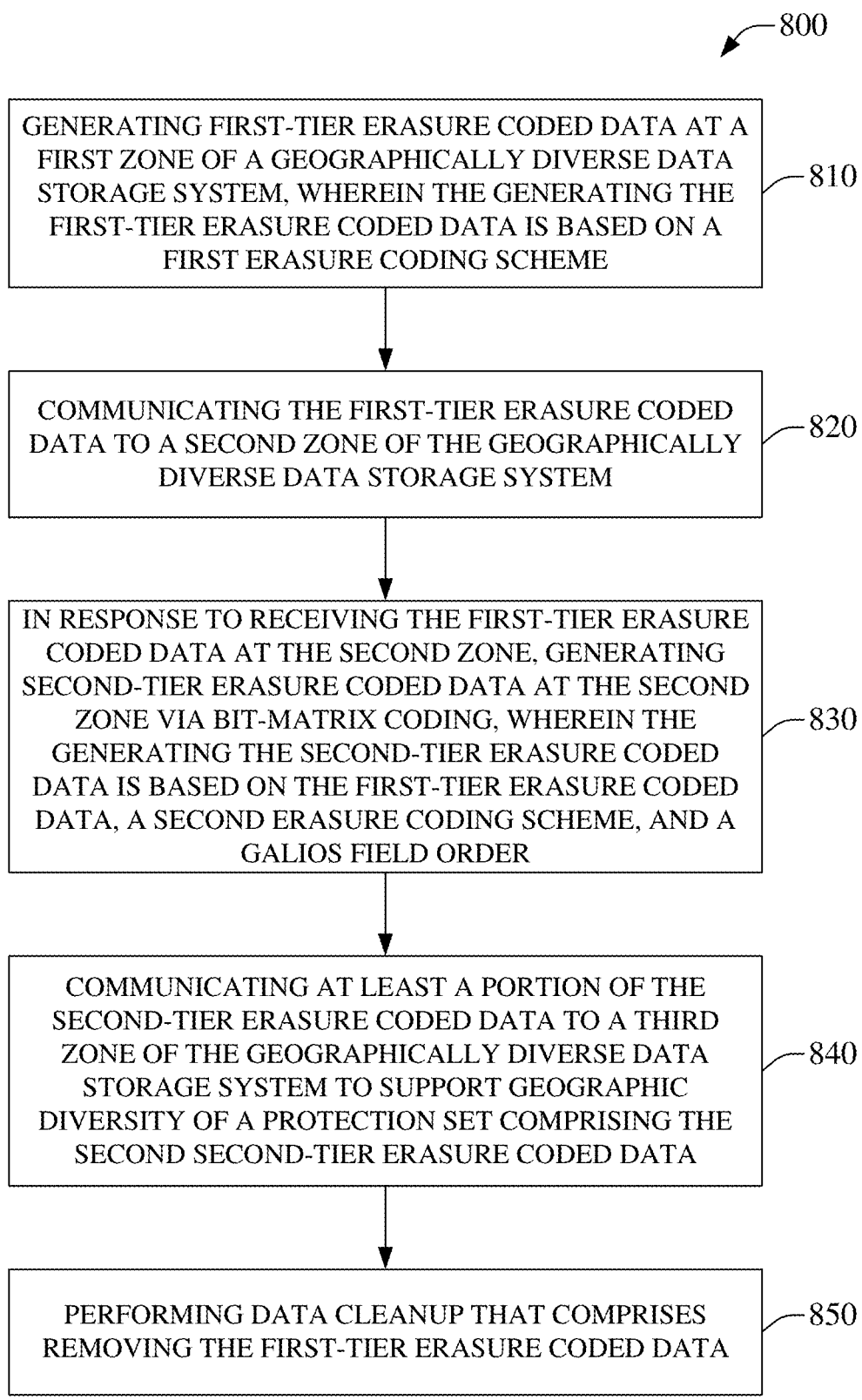
FIG. 8 illustrates an example method that enables diverse storage of portions of a protection set by employing commutative erasure coding of data, in accordance with aspects of the subject disclosure.

In view of the example system(s) described above, example method(s) that can be implemented in accordance with the disclosed subject matter can be better appreciated with reference to flowcharts in FIG. 7-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 7 is an illustration of an example method 700, facilitating commutative erasure coding of data in a geographically diverse data storage system, in accordance with aspects of the subject disclosure. At 710, method 700 can comprise receiving first-tier erasure coded data. The first-tier erasure coded data can be based on a first erasure coding scheme applied to data of a first zone of a geographically diverse data storage system to facilitate hardening the data for replication to another zone of the geographically diverse data storage system. Accordingly, in an embodiment, the first-tier erasure coded data can be communicated from a first zone and can be received at a second zone. Whereas communicating data between the zones can be non-trivial, e.g., data communication can be imperfect, the first-tier erasure coded data received at the second zone can comprise errors. However, because the first-tier erasure coded data can enable proper access to data fragments with damage of up to m of k+m data and coding fragments generated by applying a first erasure coding scheme, the data can be correctly accessed via the first-tier erasure coded data at the second zone even though it has some errors, e.g., up to m fragments of the first-tier erasure coded data can be recovered. This hardening of data for transport in a geographically diverse data storage system, e.g., across a communication framework between zones of a storage system, can therefore be preferred to merely communicating unhardened data chunks between zones.

At 720, method 700 can comprise generating second-tier erasure coded data. The generating can be based on the first-tier erasure coded data received at 710 and on a second erasure coding scheme. In an aspect, the second-tier encoding can enable more compact storage of replicate data by generating coding fragments that can be comprised in a distributed data protection set, e.g., a protection set that can comprise data stored in a distributed manner and according to the second erasure coding scheme to enable recovery of less accessible or otherwise compromised data portions in different zones. As an example, where there are Zones A to F, where Zones A to D each comprise one data fragment A1 to D1 correspondingly, and where A1 to D1 are erasure coded via a EC(4+2) scheme to generate code fragment ABCD1, which is subsequently stored at Zone E, and code fragment ABCD2 that is subsequently storage at Zone F, forming a protection set comprising A1, B1, C1, D1, ABCD1, and ABCD2, then the data represented in any of A1, B1, C1, or D1, can remain accessible with the loss of access of up to two of the Zones A to F. Continuing this example, if Zones A and B become inaccessible, other data of the protection set, which as noted can comprise A1, B1, C1, D1, ABCD1, and ABCD2, can be employed to recover the data of A1, B1, or both, e.g., ABCD1, ABCD2, C1 and D1, can be decoded, according to the EC(4+2) scheme, to generate recovered replicas of A1 and B 1. Moreover, in this example, this recovery is possible even though two zones were lost because the protection set was stored diversely in the storage system.

Method 700, at 730, can comprise performing data cleanup. The cleanup can comprise removing the first-tier erasure coded data. In an aspect, the first-tier erasure coded data can be a replica of original data, e.g., the first-tier erasure coded data can be based on a first erasure coding scheme and original data. As such, the first-tier erasure coded data can be duplicative of original data. Moreover, where second-tier erasure coded data is generated based on the first-tier erasure coded data, this second-tier erasure coded data can be duplicative of the first-tier erasure coded data and thereby also duplicative of the original data. However, where second-tier erasure coded data can be comprised in a protection set that can further comprise the original data and that can be stored diversely in a geographically diverse data storage system to provide data redundancy, the first-tier erasure coded data can be excessively redundant and can therefore be removed to conserve data storage space. Accordingly, after 730, a geographically diverse data storage system can comprise zones that can diversely store a protection set to provide data redundancy in a compact manner relative to storing multiple replicates of data.

FIG. 8 is an illustration of an example method 800, which can enable diverse storage of portions of a protection set in a geographically diverse data storage system by employing commutative erasure coding of data, in accordance with aspects of the subject disclosure. At 810, method 800 can comprise generating first-tier erasure coded data. The generating the first-tier erasure coded data can be at a first zone of a geographically diverse data storage system. Moreover, the generating the first-tier erasure coded data can be based on a first erasure coding scheme. As an example, portions of data can be encoded according to a EC(12+4) scheme, wherein, for every 12 data fragments, four coding fragments can be generated. Accordingly, for an example data chunk at a first zone, the chunk can be divided into 12 data fragments that can then be encoded according to the example EC(12+4) scheme to generate four coding fragments corresponding to the 12 data fragments of the data chunk. The example 16 fragments, e.g., 12 data fragments and four coding fragments, can then be communicated to a second zone of the geographically diverse data storage system, e.g., at 720 of method 700.

At 720, method 700 can comprise communicating the first-tier erasure coded data to a second zone of the geographically diverse data storage system. In an aspect the first zone and the second zone can be different zones and therefore can be geographically diverse from each other, e.g., the first zone can be in Canada and the second zone can be in South Africa, etc. In an aspect, returning to the above example, communicating the 16 fragments to the second zone can provide protection to the data represented therein, e.g., according to the EC(12+4) scheme, up to four of the 16 fragments can be lost before the data represented in the 16 fragments is lost. Whereas communicating data between zones can be imperfect, e.g., communicating data between Canada and South Africa can be imperfect, and damage can occur to the communicated data, e.g., data facsimile errors can occur. If the original data is communicated, any errors can result in less accessible data, however, where the first-tier erasure coded data is communicated, errors damaging up to four of the 16 fragments can be tolerated, e.g., the first-tier erasure coded data can be considered a hardened replica of the input data to the example EC(12+4) erasure coding scheme. In an embodiment, the first-tier erasure coded data can be generated and stored at the first zone prior to communicating the first-tier erasure coded data to the second zone, which can be followed by releasing the first-tier erasure coded data stored at the first zone upon the second zone error correcting and storing the first-tier erasure coded data communicated to the second zone. In another embodiment, the first-tier erasure coded data can be generated and communicated based on data of the first zone, and can be error corrected and stored at the second zone without storing a copy of the first-tier erasure coded data at the first zone. In an aspect, this other embodiment can be facilitated by a processor of the first zone, a processor of the second zone, a processor not of the first zone or second zone, or combinations thereof without departing from the scope of the disclosed subject matter.

At 830, in response to receiving the first-tier erasure coded data at the second zone, method 800 can comprise generating second-tier erasure coded data at the second zone. In an aspect, the generating the second-tier erasure coded data can be based on the first-tier erasure coded data and a second erasure coding scheme. Moreover, the generating the second-tier erasure coded data can be via bit-matrix coding based on a Galois Field order.

Erasure coding, e.g., the second-tier erasure coding of the first-tier erasure coded data, etc., can be performed via a distribution matrix that can be expanded according to a Galois Field (GF) such that bit-matrix operations can be performed via AND operations, typically more efficiently than via XOR operations associated with matrix operations for an unexpanded distribution matrix. The expanded distribution matrix and use of bit-matrix coding can be commutative in nature, e.g., where e( . . . ) can indicate a first-tier encoding, and E( . . . ) can indicate a second-tier encoding, then commutatively e(E( . . . ))=E(e( . . . )). For the above examples given in this regard to method 800, a protection set resulting from an EC(4+2) encoding of EC(12+4) encoded data can be the same, or similar, protection set at a bit-wise level as can result from an EC(12+4) encoding of EC(4+2) encoded data. Accordingly, this realization of commutativity via bit-matrix operations allowed by shifting a GF to a lower order and expanding elements of input matrixes, can facilitate directly second-tier encoding first-tier encoded data. This direct hierarchical encoding can avoid undoing a first-tier encoding to generate replicas of original data before applying a second-tier encoding to the replicas of the original data and then hardening the resulting code fragments by reapplying a further first-tier encoding to harden these code fragments for higher fidelity distribution. As an example of conventional double-encoding, 1) A can be first encoded as B, 2) B can be error corrected and copied to another zone as C, 3) C can be decoded to D that can replicate A, 4) D can be second encoded with other data to generate a code fragment E, 5) E can be third encoded as F, 6) F can be error corrected and copied to a further zone as G, 7) A and G can be comprised in a protection set, and 8) B, C, D, E, and F can be released via a cleanup operation. In contrast, according to the instant disclosure, for a commutative coding example, 1) A can be first encoded as B, 2) B can be error corrected and copied to another zone as C, 3) C can be second encoded with other data to generate a code fragment D, 4) D can be error corrected and copied to a further zone as E, 5) A and E can be comprised in a protection set, and 6) B, C, and D can be released via a cleanup operation. It is noted that the example commutative coding is substantially more direct, and comprises fewer operations, e.g., can be more computing resource efficient, etc., than the example conventional double-encoding example, while still achieving the same end.

Method 800 can further comprise, at 840, communicating at least a portion of the second-tier erasure coded data to a third zone of the geographically diverse data storage system. This can serve to support geographic diversity of data comprised in a protection set, including the portion of the second-tier data. As is noted at part 5) of the above commutative coding example, A and E can be comprised in a protection set and can be stored at diverse zones of a storage system. As can be appreciated storing all components of a protection set in a less diverse manner can result in a condition that can compromise data access, for example, storing A and E at one zone can cause a failure to access or recover A where that one zone fails. However, where A and E are diversely stored in different zones, access to the data of A, e.g., as represented in A and redundantly in E, can be accomplished even with the loss of either zone. The particular details of diverse storage of a protection set is tangential to the instant disclosure and is not discussed in detail herein for the sake of clarity and brevity, however the instant disclosure is expressly not limited to the examples of diverse storage for protection sets recited herein to provide context to the disclosed commutative coding technology.

Method 800, at 850, can comprise performing data cleanup. The cleanup can comprise removing the first-tier erasure coded data. Whereas the first-tier erasure coded data can be a replica of original data, it can be duplicative of original data and, after second-tier erasure coding, it can also be duplicative of the second-tier erasure coded data. Therefore, the first-tier erasure coded data can be removed to conserve data storage space. Typically this can occur after diversifying the storage of a related protection set, wherein a diversely stored protection set can provide data redundancy in a more compact manner than storing multiple replicates of data.

Figure 9:
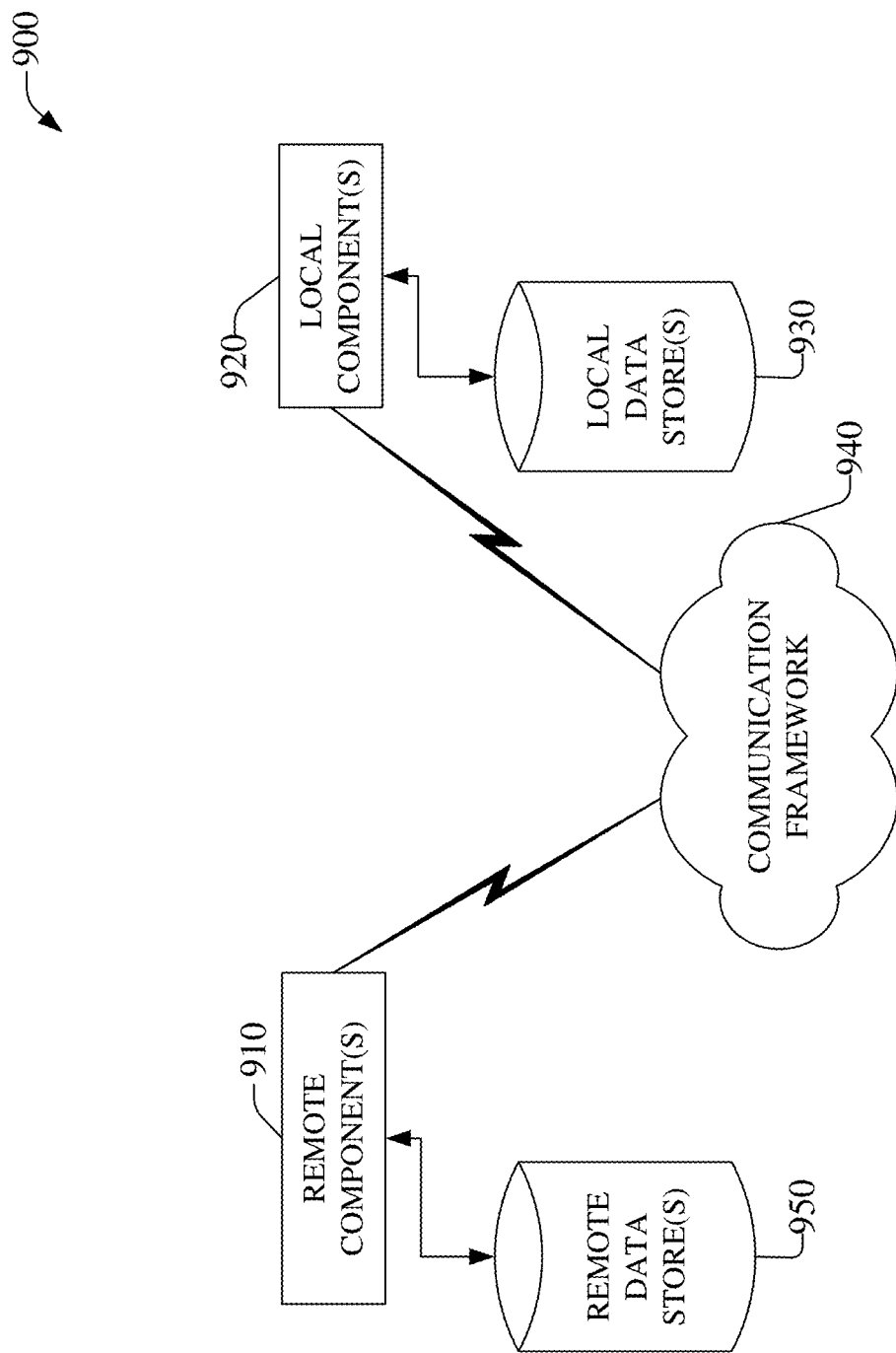
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a remotely located ZSC connected to a local ZSC via communication framework, e.g., communication framework 102, 202, 940, etc. Communication framework 940 can comprise wired network devices, wireless network devices, mobile devices, wearable devices, radio access network devices, gateway devices, femtocell devices, servers, etc. In an aspect the remotely located ZSC can be embodied in ZSC 110, 120, 130, Zones A-F of system 200, 600, etc., or other ZSC disclosed herein. In some embodiments, remote component(s) 910 can be embodied in ECCC 108, etc., CBCC 107, 407, 607, etc., BMCC 406, 606, etc., or other remotely located components disclosed herein.

The system 900 also comprises one or more local component(s) 920. The local component(s) 920 can be hardware and/or software (e.g., threads, processes, computing devices). In some embodiments, local component(s) 920 can comprise a local ZSC connected to a remote ZSC via communication framework 102, 202, 940, etc. In an aspect the local ZSC can be embodied in ZSC 110, 120, 130, Zones A-F of system 200, 600, etc., ECCC 108, etc., CBCC 107, 407, 607, etc., BMCC 406, 606, etc., or other local components disclosed herein.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As an example, information corresponding to chunks stored on ZSCs can be communicated via communication framework 940 to other ZSCs of a storage network, e.g., to facilitate recovering segments protected by a hierarchical erasure coding scheme, etc., as disclosed herein.

Figure 10:
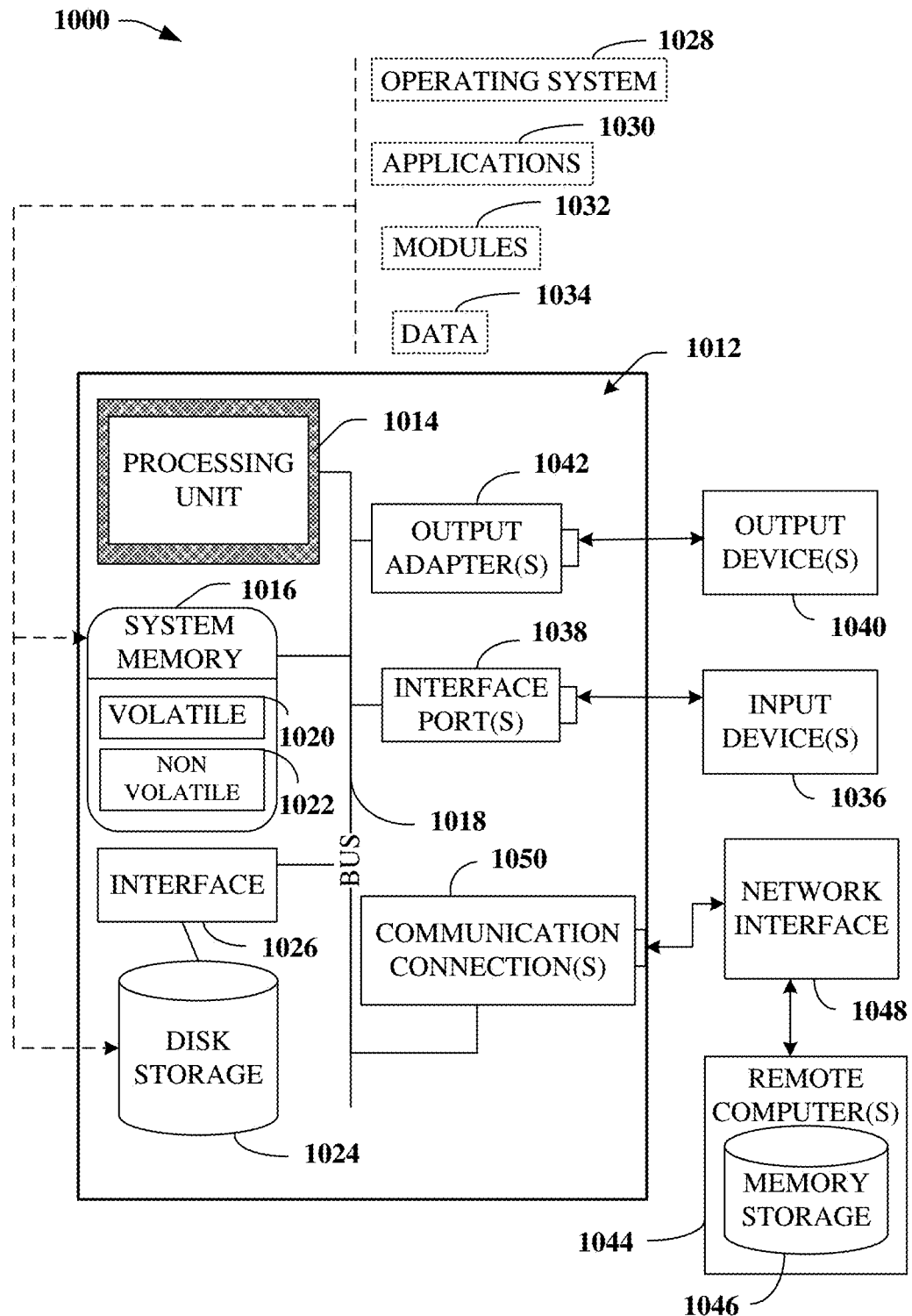
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in a ZSC 110, 120, 130, Zones A-F of system 200, 600, etc., ECCC 108, etc., CBCC 107, 407, 607, etc., BMCC 406, 606, etc., or in other components disclosed herein, can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synch-Link dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising generating second-tier data based on encoding first-tier data according to a second erasure coding scheme, wherein the first-tier data itself can result from encoding original data according to a first encoding scheme. In an aspect, the original data of the example can be stored via a first zone of a geographically diverse data storage system, the first-tier data can be stored via a second zone, and a portion of the second-tier data, that can be comprised in a protection set, can be stored via a third zone. In this example, the generating the second-tier data can comprise performing bit-matrix operations in accord with a determined Galois Field. Further, in this example, garbage collection operations can eventually removing the first-tier data because it can be excessively redundant data in view of the original data and the second-tier data.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
   receiving first data encoded according to a first erasure coding scheme, wherein the first data is communicated from a first zone of a geographically diverse data storage system, and wherein the receiving the first data is at a second zone of the geographically diverse data storage system;
   generating a second data according to a second erasure coding scheme, wherein the generating the second data is based on the first data, and wherein the generating the second data comprises performing a bit-matrix operation;
   communicating a first portion of the second data to a third zone of the geographically diverse data storage system, wherein the first portion of the second data is comprised in a protection set; and removing redundant data other than redundant data comprised in the protection set.

2. The system of claim 1, wherein the first data is based on first original data stored at the first zone.

3. The system of claim 2, wherein the protection set comprises further comprises the first original data.

4. The system of claim 3, wherein the protection set comprises further comprises second original data stored via a fourth zone of the geographically diverse data storage system.

5. The system of claim 1, wherein the first zone is geographically diverse from the second zone, wherein the first zone is geographically diverse from the third zone, and wherein the second zone is geographically diverse from the third zone.

6. The system of claim 1, wherein the first erasure coding scheme is selected from a group of erasure coding schemes comprising a '12+4' erasure coding scheme, a '10+2' erasure coding scheme, and a '4+2' erasure coding scheme.

7. The system of claim 1, wherein the second erasure coding scheme is selected from a group of erasure coding schemes comprising a '12+4' erasure coding scheme, a '10+2' erasure coding scheme, and a '4+2' erasure coding scheme.

8. The system of claim 1, wherein the first erasure coding scheme is a different erasure coding scheme than the second erasure coding scheme.

9. The system of claim 1, wherein the performing the bit-matrix operation corresponds to a Galois Field order.

10. The system of claim 9, wherein the Galois Field order is $2^w$.

11. The system of claim 9, wherein the Galois Field order is 2.

12. The system of claim 11, wherein the performing the bit-matrix operation further comprises expanding elements of an input matrix in correspondence with the Galois field order being reduced from $2^w$ to 2.

13. The system of claim 1, wherein the generating the second data according to a second erasure coding scheme comprises generating the second data based on the first data without an intervening decoding of the first data.

14. A method, comprising:

encoding, by a system comprising a processor, second-tier data based on first-tier data, wherein the first-tier data is in accord with a first erasure coding scheme, wherein the first-tier data is based on original data, wherein the original data is stored via a first zone of a geographically diverse data storage system, wherein the first-tier data is stored via a second zone of the geographically diverse data storage system, and wherein the second-tier data is in accord with a second erasure coding scheme;

in response to the encoding the second-tier data, facilitating, by the system, storage of a portion of the second-tier data via a third zone of the geographically diverse data storage system, wherein a protection set comprises the portion of the second-tier data, and wherein the storage of the portion of the second-tier data via the third zone is in accord with a diverse storage scheme corresponding to the protection set; and removing, by the system, the first-tier data in response to determining that the first-tier data is excessively redundant data.

15. The method of claim 14, wherein the first erasure coding scheme is a different erasure coding scheme than the second erasure coding scheme.

16. The method of claim 14, wherein the original data is an original data chunk, wherein the first-tier data is a first-tier data chunk that results from encoding data fragments comprising the original data chunk according to the first erasure coding scheme, wherein the encoding the second-tier data is based on the first-tier data chunk and another data chunk and further results in generating a coding chunk, and wherein the portion of the second-tier data is the coding chunk stored via the third zone.

17. The method of claim 14, wherein the encoding the second-tier data comprises bit-matrix operations corresponding to a reduced Galois Field order, such that the encoding the original data according to the first erasure coding scheme and then the second erasure coding scheme is commutative with encoding the original data according to the second erasure coding scheme and then the first erasure coding scheme.

18. A non-transitory machine-readable medium, comprising executable instructions that, when executed by a processor, facilitate performance of operations, comprising:

in response to receiving first-tier data resulting from encoding original data according to a first encoding scheme, generating second-tier data based on encoding the first-tier data according to a second erasure coding scheme, wherein the original data is stored via a first zone of a geographically diverse data storage system, wherein the first-tier data is stored via a second zone of the geographically diverse data storage system, and wherein the generating the second-tier data comprises performing bit-matrix operations in accord with a determined Galois Field;

enabling storage of a portion of the second-tier data via a third zone of the geographically diverse data storage system, wherein the portion of the second-tier data is comprised in a protection set; and performing a garbage collection operation that can comprise removing the first-tier data as being excessively redundant data.

19. The non-transitory machine-readable medium of claim 18, wherein the first-tier data encodes data stored within a chunk, and wherein the second-tier data encodes data stored between chunks.

20. The non-transitory machine-readable medium of claim 18, wherein the first encoding scheme and the second encoding scheme are each selected from a group of encoding schemes comprising a '12+4' erasure coding scheme, a '10+2' erasure coding scheme, and a '4+2' erasure coding scheme.

* * * * *